(12) United States Patent
Bedier

(10) Patent No.: US 7,860,784 B2
(45) Date of Patent: Dec. 28, 2010

(54) METHOD AND SYSTEM FOR USER PAYMENT ACCOUNT MANAGEMENT

(75) Inventor: Osama Mostafa Bedier, San Jose, CA (US)

(73) Assignee: eBay Inc., San Jose, CA (US)

( * ) Notice: Subject to any disclaimer, the term of this patent is extended or adjusted under 35 U.S.C. 154(b) by 109 days.

(21) Appl. No.: 11/617,975

(22) Filed: Dec. 29, 2006

(65) Prior Publication Data

US 2008/0162343 A1 Jul. 3, 2008

(51) Int. Cl.
*G06Q 40/00* (2006.01)
(52) U.S. Cl. ............................... 705/38; 705/35; 705/4; 705/39; 235/383
(58) Field of Classification Search .................. 705/38, 705/14; 235/380
See application file for complete search history.

(56) References Cited

U.S. PATENT DOCUMENTS

| | | | |
|---|---|---|---|
| 5,692,132 A * | 11/1997 | Hogan | 705/27 |
| 5,884,284 A * | 3/1999 | Peters et al. | 705/30 |
| 5,914,472 A * | 6/1999 | Foladare et al. | 235/380 |
| 5,953,710 A * | 9/1999 | Fleming | 705/38 |
| 6,173,269 B1 * | 1/2001 | Solokl et al. | 705/35 |
| 6,546,392 B1 * | 4/2003 | Bahlmann | 707/9 |
| 6,796,497 B2 * | 9/2004 | Benkert et al. | 235/380 |
| 7,765,148 B2 * | 7/2010 | German et al. | 705/37 |
| 2002/0095376 A1 * | 7/2002 | Likourezos et al. | 705/40 |
| 2003/0036996 A1 * | 2/2003 | Lazerson | 705/38 |
| 2005/0044017 A1 * | 2/2005 | Foss et al. | 705/30 |
| 2005/0144074 A1 * | 6/2005 | Fredregill et al. | 705/14 |

OTHER PUBLICATIONS https://www.utruepay.com/?gclid=COjsmlyZ16ACFZZg2godwxsgDg (UTrue).*
http://www.authorize.net/advantage/ (Authorize.net).*
http://shopsite.com/tms.html (Merchant0.*
Russ, Jones, The Paypal Phenomenon, Lessons from the leading Edge of Online payments, Nov. 2001 (NuVantage).*
John M. Gallaugher, E-Commerce and the Undulating Distribution Channel, Communications of the ACM, Jul. 2002. vol. 45 No. 7(Undulating).*

* cited by examiner

*Primary Examiner*—Ella Colbert
*Assistant Examiner*—Chika Ojiaku
(74) *Attorney, Agent, or Firm*—Schwegman, Lundberg & Woessner, P.A.

(57) ABSTRACT

Embodiments of a method and system for user payment account management in a networked system are disclosed. User information regarding a user, an account identifier, and a server location may be received from a merchant application. The account identifier may identify the user to the merchant application. An underwriting process may be initiated using the user information to determine whether to establish a user payment account for the user. The user payment account may enable the user to perform at least one of making a payment and receiving a payment in a networked system. The user payment account may be established for the user in response to a result of the underwriting process. Establishment information may be provided regarding the user payment account and the account identifier at the server location designated by the merchant application. The establishment information may include information regarding functionality available through use of the user payment account.

25 Claims, 17 Drawing Sheets

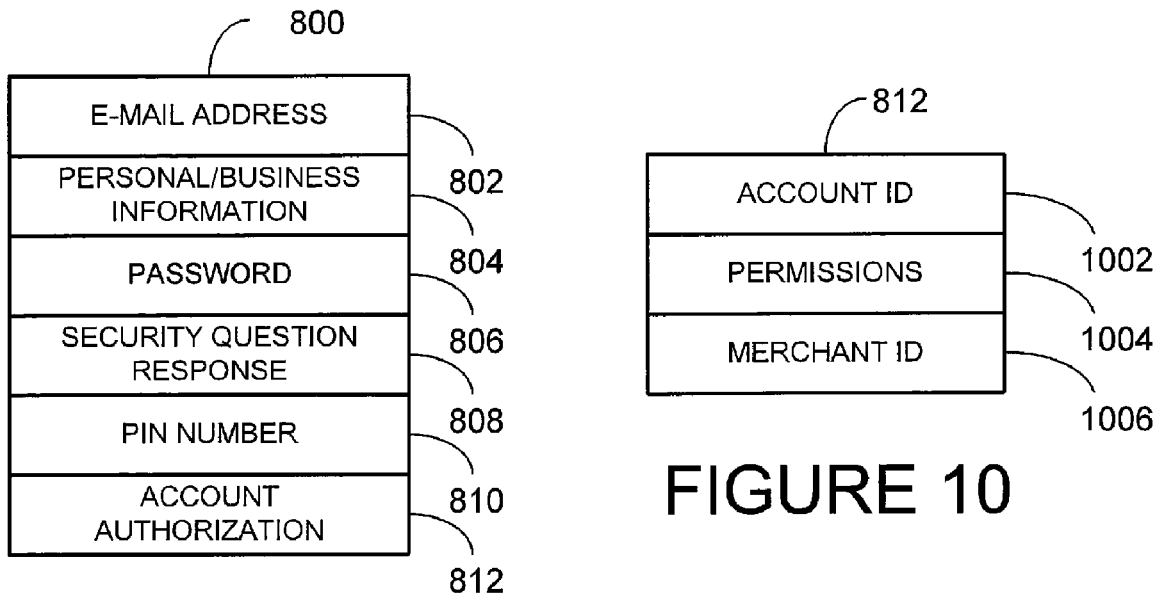
FIGURE 8
FIGURE 10
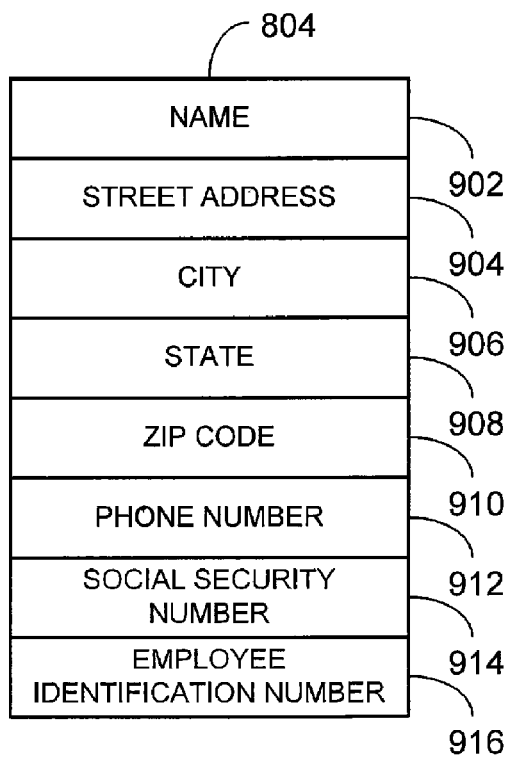
FIGURE 9

METHOD AND SYSTEM FOR USER PAYMENT ACCOUNT MANAGEMENT

TECHNICAL FIELD

The present application relates generally to the field of electronic payments and, in one specific example, to a method and system for managing a user payment account in a networked system.

BACKGROUND

Buyers may initiate an electronic payment online from a user payment account of a buyer to a seller. Receipt of the electronic payment is generally received by a user payment account of the seller. The seller may then be notified of receipt of the payment by a communication from an application managing the user payment accounts.

BRIEF DESCRIPTION OF THE DRAWINGS

Some embodiments are illustrated by way of example and not limitation in the figures of the accompanying drawings in which:

FIG. 8 is a block diagram of an example user profile data structure;

FIG. 9 is a block diagram of an example personal/business information data structure;

FIG. 10 is a block diagram of an example account authorization data structure;

DETAILED DESCRIPTION

Figure 1:
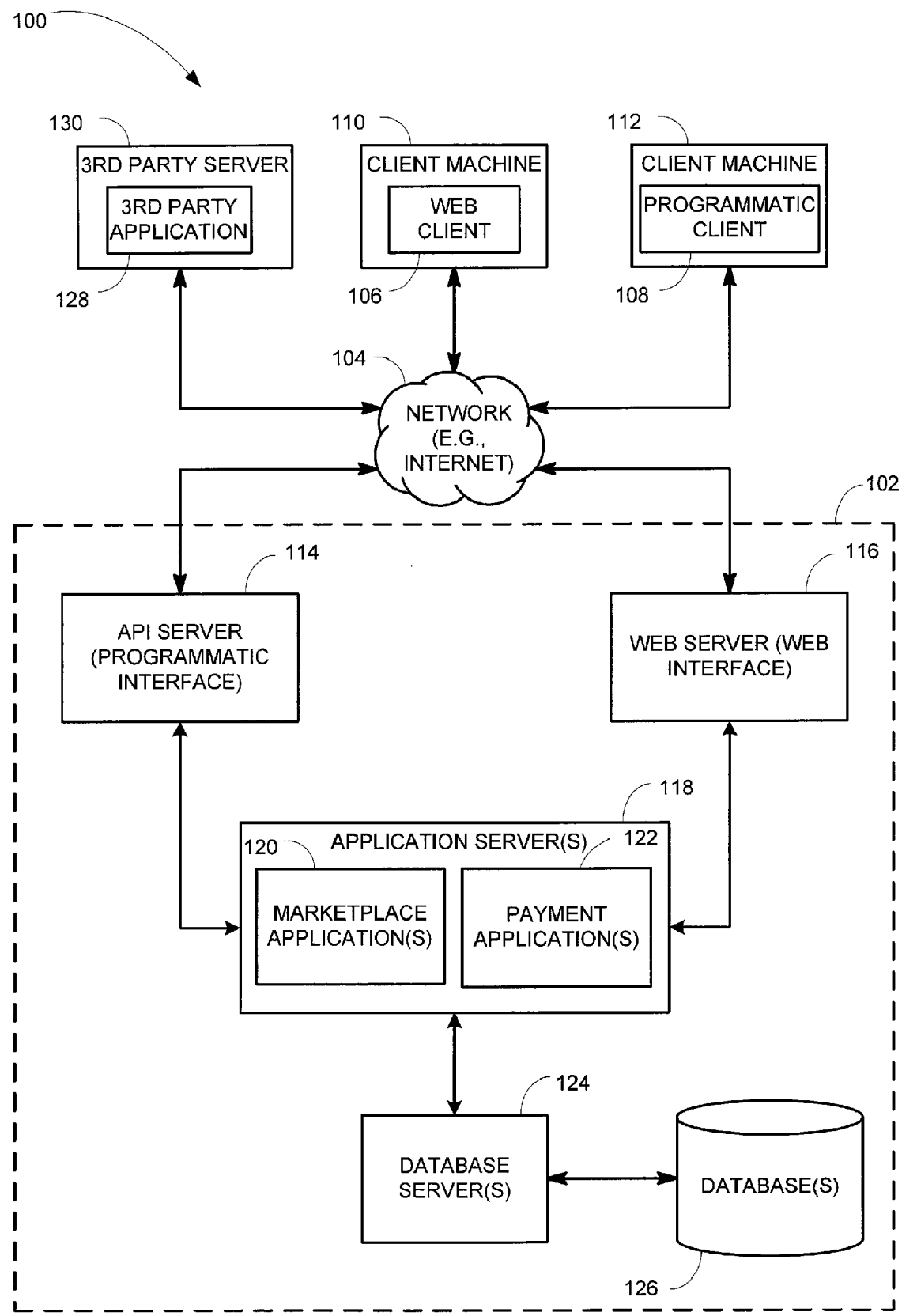
FIG. 1 is a network diagram depicting a network system, according to one embodiment, having a client server architecture configured for exchanging data over a network.

Example methods and systems for a method and system of user payment account management in a networked system are described. In the following description, for purposes of explanation, numerous specific details are set forth in order to provide a thorough understanding of example embodiments. It will be evident, however, to one skilled in the art that the present invention may be practiced without these specific details.

In an example embodiment, user information regarding a user, an account identifier, and a server location may be received from a merchant application. The account identifier may identify the user to the merchant application. An underwriting process may be initiated using the user information to determine whether to establish a user payment account for the user. The user payment account may enable the user to perform at least one of making a payment and receiving a payment in a networked system. The user payment account may be established for the user in response to a result of the underwriting process. Establishment information may be provided regarding the user payment account and the account identifier at the server location designated by the merchant application. The establishment information may include information regarding functionality available through use of the user payment account.

In an example embodiment, a request may be received from a user application in a networked system for payment functionality. The payment functionality may include processing of a credit card payment. The user information may be accessed regarding a user. The user may be associated with the user application. The user information, an account identifier, and a server location may be provided to a payment application. The payment application may be capable of providing the payment functionality to the user application. An establishment notification may be received from the payment application. The establishment information may include information regarding functionality available through use of a user payment account. The user application may be configured to access the user payment account for payment functionality.

In an example embodiment, a payment processing request may be received from a user application in a networked system. An account identifier associated with the user application may be accessed. The payment processing request and the account identifier may be provided to a payment application. The payment application may be capable of processing the payment processing request. A notice regarding processing of the payment processing request and the account identifier may be received from the payment application. The user application may be updated from receipt of the notice.

In an example embodiment, a processing request may be received from a requestor in a networked system. The processing request may be a request to provide one or more representative requests from the requestor for at least one of a user payment account or a user profile associated with the user payment account. A merchant id of the requestor may be accessed. The merchant id may include a merchant with which the requestor is associated. Account relationship information may be accessed for the merchant. The account relationship information may define a sub-account associated with the merchant. The one or more representative requests of the requester may be received and processed when the user payment account is a sub-account associated with the merchant.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party may, for example, provide one or more promotional, marketplace or payment functions that are supported by the relevant applications of the networked system 102.

Figure 2:
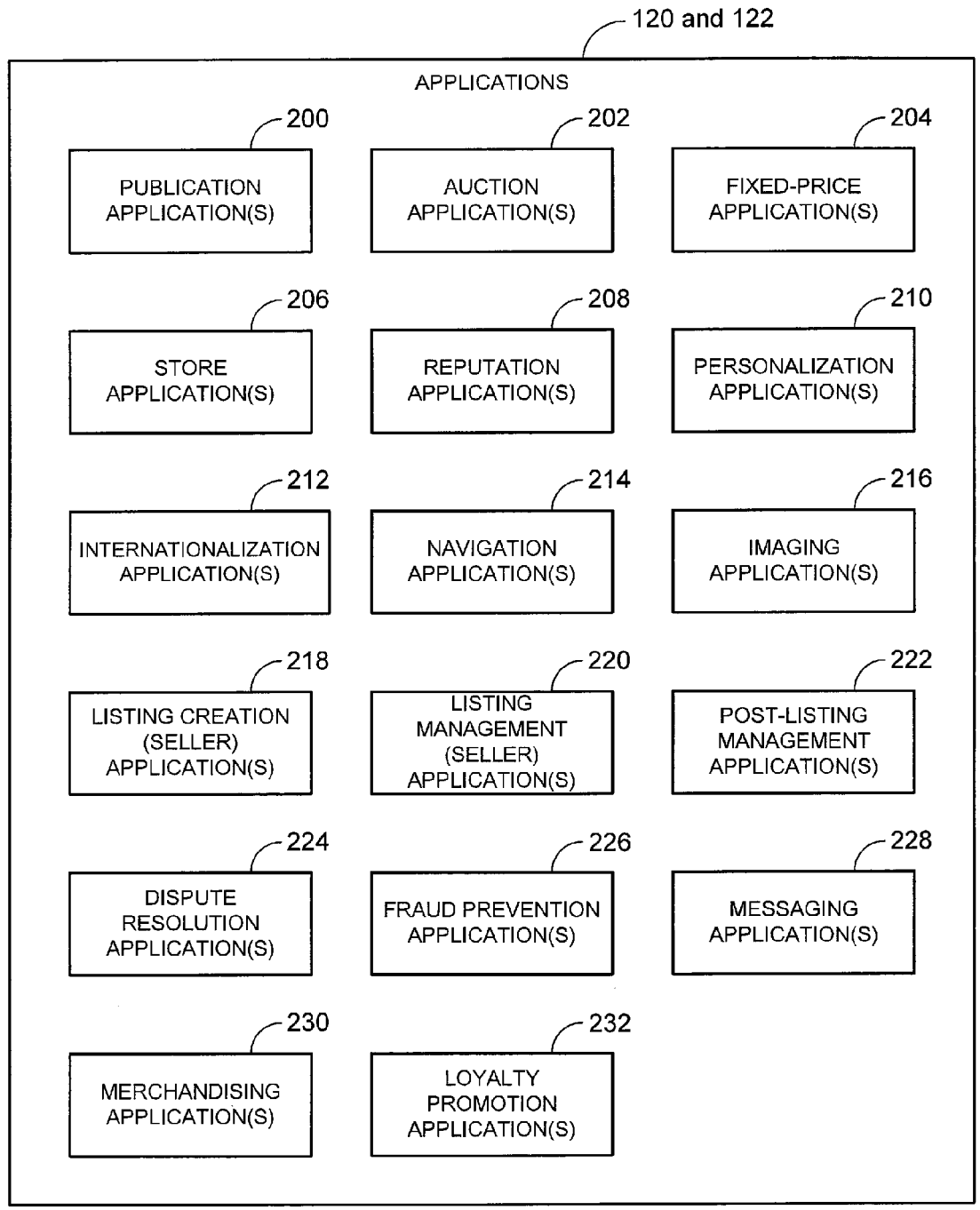
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
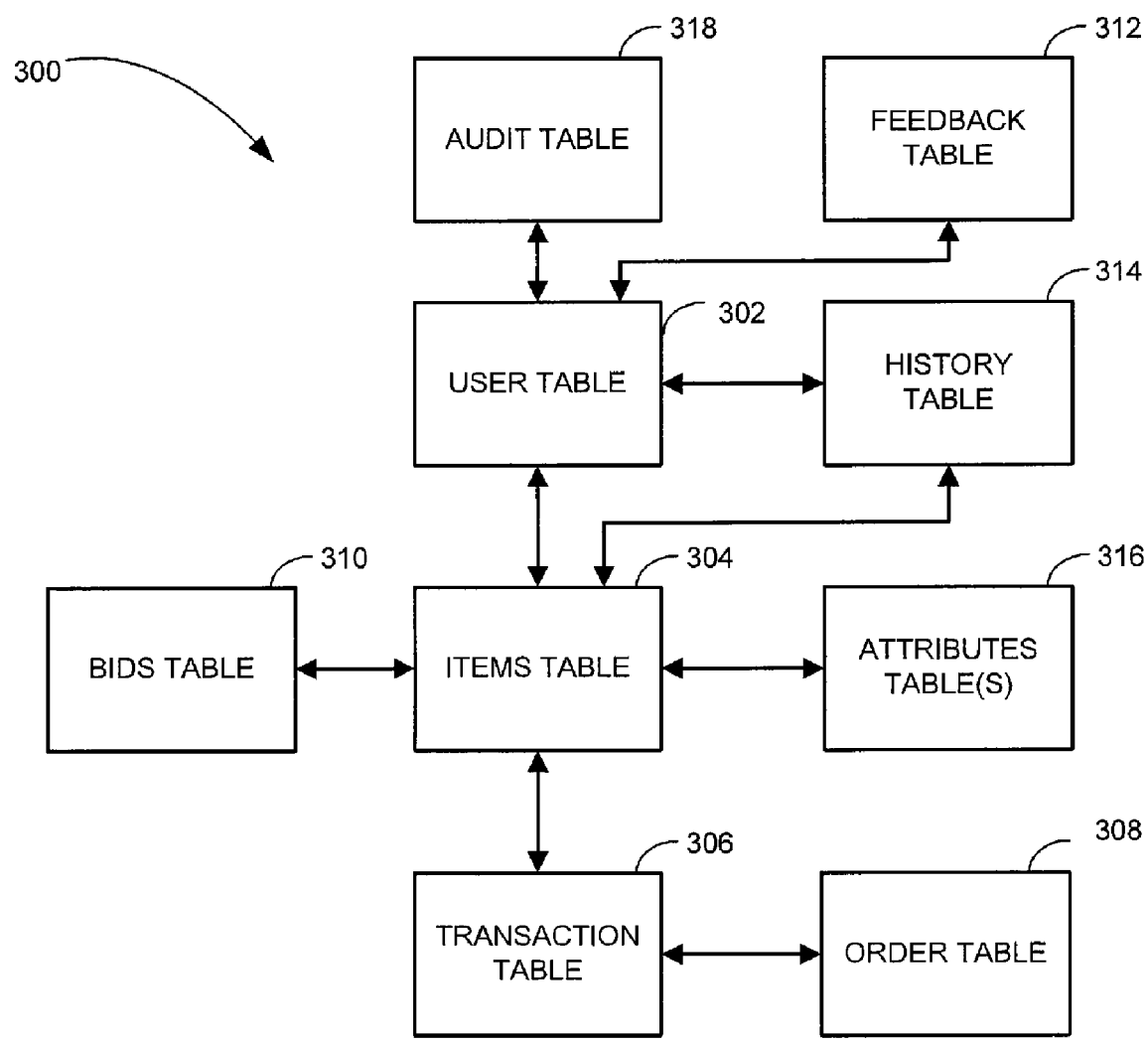
FIG. 3 is a high-level entity-relationship diagram, in accordance with one example embodiment, illustrating various tables that may be maintained within one or more databases.

FIG. 3 is a high-level entity-relationship diagram, illustrating various tables 300 that may be maintained within the databases 126, and that are utilized by and support the applications 120 and 122 (see FIG. 1). A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items (e.g., products and/or services) that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order for a good and/or service. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users.

A history table 314 maintains a history of transactions to which a user has been a party. The transactions may include those pertaining to items for which records exist within the items table 304 and for items with which no records exist within the items table 304 (e.g., for which payment services and functions of the payment application 122 were used without the marketplace application 120).

One or more attribute tables 316 record attribute information pertaining to items for which records exist within the items table 304. Considering only a single example of such an attribute, the attribute tables 316 may indicate a currency attribute associated with a particular item, the currency attribute identifying the currency of a price for the relevant item as specified in by a seller.

The audit table 318 tracks actions of each user of the user table by logging activity with the networked system 102 (see FIG. 1). The audit table 318 may contain a history of actions performed by a user to investigate an occurrence within the networked system 102. For example, the history of actions of the audit table 318 of a user may be reviewed for customer service purposes.

Figure 4:
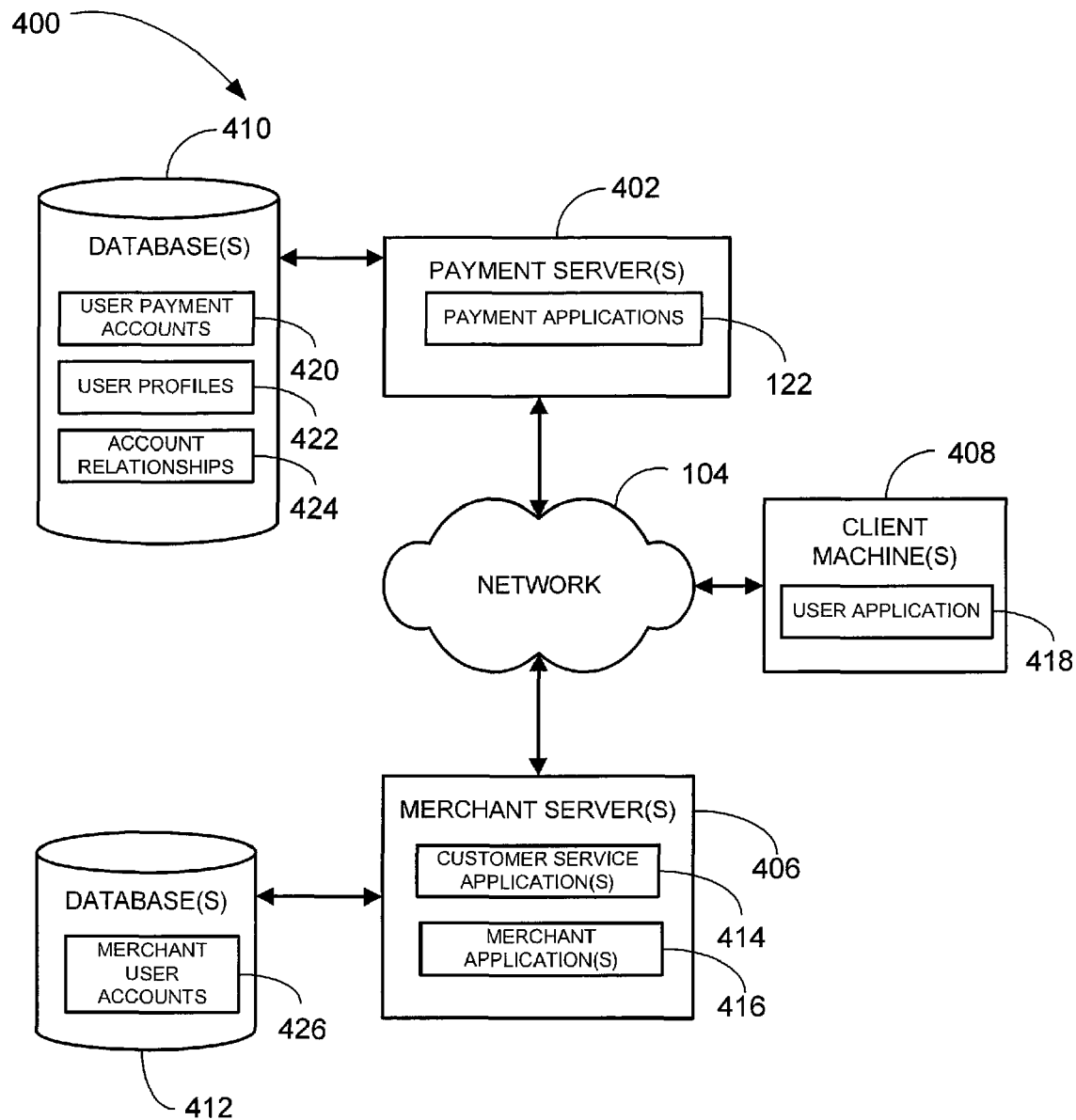
FIG. 4 is a block diagram of a payment system for exchanging data over a network according to an example embodiment.

Referring to FIG. 4, a payment system 400 according to an example embodiment is illustrated. A payment server 402 may communicate over the network 104 (see FIG. 1) with a merchant server 406 and one or more client machines 408. The payment server 402 may include the payment applications 122 (see FIG. 1) and may be in communication with a payment database 410.

The merchant server 406 may host a customer service application 414 and/or a merchant application 416 and be in communication with a merchant database 412. The customer service application 414 may enable the merchant to provide customer service for a plurality of merchant user accounts 426 and/or a portion of a plurality of user payment accounts 420. For example, the merchant may provide customer service to a portion of the plurality of user payment accounts 420 through API. In an example embodiment, the customer service application 414 may not be available to persons without customer service access at the merchant.

It should be appreciated that the merchant need not sell, offer to sell, or buy something of value, but may instead be an of operator (e.g., a third party) of the customer service application 414 and/or the merchant application 416.

By way of example, the customer service application 414 may queue all customer service requests for a period of time, or process each customer service request when received. The customer service application 414 may integrate customer service (e.g., through a common interface) for both the merchant user accounts 426 and/or the user payment accounts 420.

The merchant application 416 may include the functionality of the third party application 128 and/or the marketplace application 120 (see FIG. 1). For example, the merchant application 416 may include a server-side application of Microsoft Office Accounting by Microsoft Corporation.

The client machine 408 may include a user application 418. The client machine 408 may include the functionality of the client machine 110, 112 and the user application 418 may include the functionality of the web client 106 and/or the programmatic client 108. For example, the user application 418 executing on the client machine 408 include Microsoft Office by Microsoft Corporation, Quicken by Intuit, Inc., or Quick Books by Intuit, Inc.

The payment database 410 may include a plurality of user payment accounts 420, a plurality of user profiles 422, and account relationships 424. The plurality of user payment accounts 420 may contain an account for each user of the payment applications 122 to enable the user to make a payment and/or receive a payment (e.g., through the system 100). The plurality of user profiles 422 may contain a user profile for each user communicating with the payment application 122. A user associated with the user profile 422 may have access to one or more user payment accounts 420.

The account relationships 424 may associate a first user payment account 420 to one or more additional user payment accounts 420. For example, the account relationships may indicate that a user payment account 420 may not be associated with another user payment account 420, may be a merchant account for one or more sub-accounts, or may be a sub-account to a merchant account. An example embodiment of the account relationships 424 is described in greater detail below.

The merchant database 412 may include the plurality of merchant user accounts 426. The merchant user accounts 426 may be accounts for a number of users to communicate with the merchant application 416.

Figure 5:
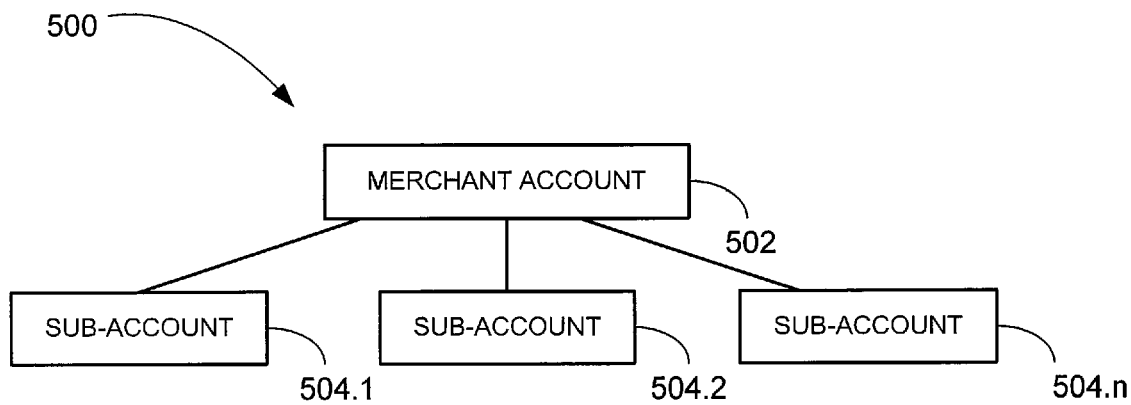
FIG. 5 is a block diagram of an example account relationship data structure.

Referring to FIG. 5, an example account relationship data structure 500 is illustrated. In an example embodiment, the account relationships 424 (see FIG. 4) may include one or more of the account relationship data structures 500.

A merchant account 502 may be associated with one or more sub-accounts 504.1-504.n. The merchant account 502 may be a user payment account 420 (see FIG. 4) for a merchant operating the merchant server 406. For example, the merchant account 502 may be associated with a sub-account 504 when the merchant has originated the sub-account 504, when a user of the sub-account 504 also has a merchant user account 426 (see FIG. 4), and the like.

In an example embodiment, it should be appreciated that a merchant associated with the merchant account 502 need not operate the merchant server 406 or operate the merchant database 412.

The sub-account 504 may be a user payment account 420 of a user that is associated with the merchant account 502. In an example embodiment, a user associated with the sub-account 504 may be able to seek assistance (e.g., with the user payment account 420 and/or the user profile 422) from the merchant associated with the merchant account 502 and/or a provider associated with the payment application 122 (see FIG. 1).

In an example embodiment, the sub-accounts 504.1-504.n of the merchant account 502 may be in a segmented portion of the user payment accounts 420.

Figure 6:
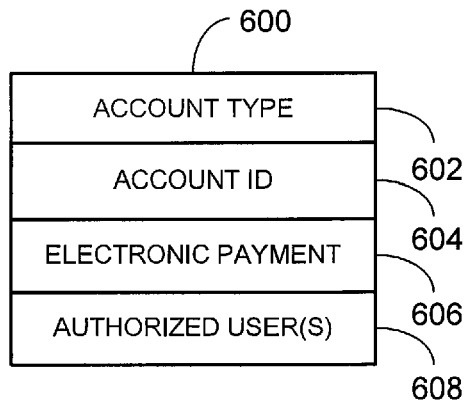
FIG. 6 is a block diagram of an example user payment account data structure.

Referring to FIG. 6, an example user payment account data structure 600 according to an example embodiment is illustrated. In an example embodiment, the user payment accounts 420 (see FIG. 4) may include a plurality of the user payment account data structures 600.

The user payment account data structure 600 may include an account type field 602, an account id field 604, an electronic payment data structure 606, and an authorized user field 608.

The account type field 602 retains an account identifier to identify an account type for the user account. For example, the account type may indicate that the user payment account 420 is associated with a person or a business, and/or may indicate a tier of access available (e.g., to the person or business). For example, a first tier may be for a personal account, a second pier may be for an enhanced personal account that can accept credit card payments, and a third tier may be a business account that can process credit card payments (e.g., through a virtual terminal and/or an API in communication with the payment application 122).

The account id field 604 retains an account id for identification (e.g., to enable identification of the user payment account data structure 600 from among a plurality of user payment account data structures 600 within the user payment accounts 420).

The electronic payment data structure 606 may include a number (e.g., one or a plurality) of electronic payment fields that each provide access to an account value (e.g., an accumulated value or an owed value) from a payment source (e.g., a user account, a bank account, or a credit card account) identified from among one or more payment sources. In an example embodiment, the account value may indicate a funds availability of a payment source. An example embodiment of the electronic payment data structure 606 is described in greater detail below.

An authorized user field 608 may designate one or more users that are authorized to access the user payment account data structure 600. For example, the authorized users may have full use of the user payment account data structure 600 or may have limited use of the user payment account data structure 600. In an example embodiment, the authorized user field 608 may contain one or more links to user profiles 422 of users that are authorized users of the user payment account data structure 600.

Figure 7:
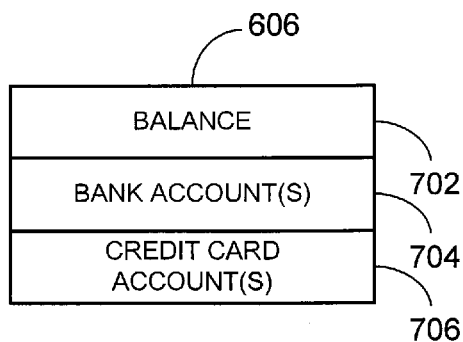
FIG. 7 is a block diagram of an example electronic payment data structure.

Referring to FIG. 7, example electronic payment data structure 606 (see FIG. 6) is illustrated. The electronic payment data structure 606 may include a balance field 702, one or more bank account fields 704, and/or one or more credit card account fields 706.

The balance field 702 provides access to a balance of a value (e.g., a value balance) associated with the user payment account data structure 600 (see FIG. 6). For example, the value balance may indicate an amount of money owed or that is available within the user payment account data structure 600. The bank accounts field 704 provides access to the value in a bank account. The credit card account field 706 provides access to the value from a credit card account (e.g., as may be borrowed from the credit card account).

It may be appreciated that other types of payment sources (e.g., beyond a balance, a bank account, or a credit card account) may be used and that an additional electronic payment field may access the value associated with the additional payment source.

Referring to FIG. 8, an example user profile data structure 800 is illustrated. In an example embodiment, the user profiles 422 (see FIG. 4) may include a plurality of the user profile data structures 800.

The user profile data structure 800 may include one or more e-mail address fields 802, one or more personal/business information data structures 804, one or more password fields 806, one or more security question response fields 808, a pin number field 810, and/or one or more account authorization data structures 812.

The one or more e-mail address fields 802 may retain an e-mail address (e.g., a primary or an alternate e-mail address) for the user.

The one or more personal/business information data structures 804 may each include a number of personal/business information fields to retain a mailing address, a telephone number, and the like. An example embodiment of the personal/business information data structure 804 is described in greater detail below.

The password field 806 retains a verification value (e.g., a password) to be used by the user to verify account access.

The one or more security question response fields 808 may each retain a responses to a security question and may optionally identify the security question to which the response is directed. For example, the security questions may be questions posed to a user by the payment applications 122 (see FIG. 1) such as "What is your mother's maiden name?", "Where were you born?", "What was the name of your first pet?", and the like.

The pin number field 810 may retain a pin number (e.g., a four digit pin or a six digit pin) for the user profile data structure 800. For example, the pin number may be a code used by a user to facilitate payments using a mobile device (e.g., by SMS or a phone call).

The one or more account authorization data structures 812 define one or more user payment accounts 420 that the user is authorized to access, permissions defining functionality that the user is permitted to access for the user payment account 420, and an optional merchant id to identify a merchant with which the user is associated. An example embodiment of the account authorization data structure 812 is described in greater detail below.

Referring to FIG. 9, an example personal/business information data structure 804 (see FIG. 8) is illustrated. The personal/business information data structure 804 may include a name field 902, a street address field 904, a city field 906, a state field 908, a zip code field 910, a phone number field 912, a social security number field 914, and/or an employee identification number field 916.

The name field 902 provides (e.g., by retaining) a name of the user associated with the user payment account, a street address field 904 provides a street of a mailing address of the user, a city field 906 provides a city of the mailing address of the user, a state field 908 provides a state of the mailing address of the user, a zip code field 910 provides a zip code of the mailing address of the user, a phone number field 912 provides a phone number of the user, a social security number field 914 provides a social security number of the user, and/or an employee identification number field 916 provides an employee identification (e.g., a federal tax identification) of the user.

Referring to FIG. 10, an example account authorization data structure 812 (see FIG. 8) is illustrated. The account authorization data structure 812 may include an account id field 1002, a permissions field 1004, and a merchant id field 1006.

The account id field 1002 provides (e.g., by retaining) an account id to associate the user profile data structure 800 (see FIG. 8) with a user payment account data structure 600 (see FIG. 6) from among the plurality of user payment accounts 420.

The permissions field 1004 includes one or more permissions to enable a user associated with the user profile data structure 800 to have certain access, modification, and use rights. For example, the rights may include rights for accessing and/or modifying an associated user payment account data structure 600, accessing and/or modifying the user profile data structure 800, or using certain functionality of the payment application 122.

The permissions field 1004 may enable a user associated with the user profile data structure 800 to be a master user (e.g., a CFO) with access to almost all portions of the user payment account data structure 600 and the user profile data structure 800 (e.g., to see the accumulated value in the account or transfer accumulated value from the user payment account 420). The permissions field 1004 may enable a user associated with the user profile data structure 800 to act in a customer service capacity. Other permission settings of the permission field may also be used.

Not all permissions may be available to all users, and an operator of the payment application may add and/or remove one or more permissions for individual users. For example, a customer service user type may have access to reporting and/or data collection capabilities while a standard user would not have such capabilities. By way of example, the customer service user type may enable a user to review the audit table 318 (see FIG. 3) to analyze a problem that may have occurred.

In an example embodiment, one or more permissions may be inherited from the users associated with the merchant account 502 when accessing the sub-accounts 504. For example, the inherited permissions provided to a user may depend on a role of a user within an organization of the merchant.

The optional merchant id field 1006 identifies (e.g., by retaining) an identification of whether a user is associated with a merchant. For example, a merchant identification of a user may indicate that a user is a representative of a merchant.

Figure 11:
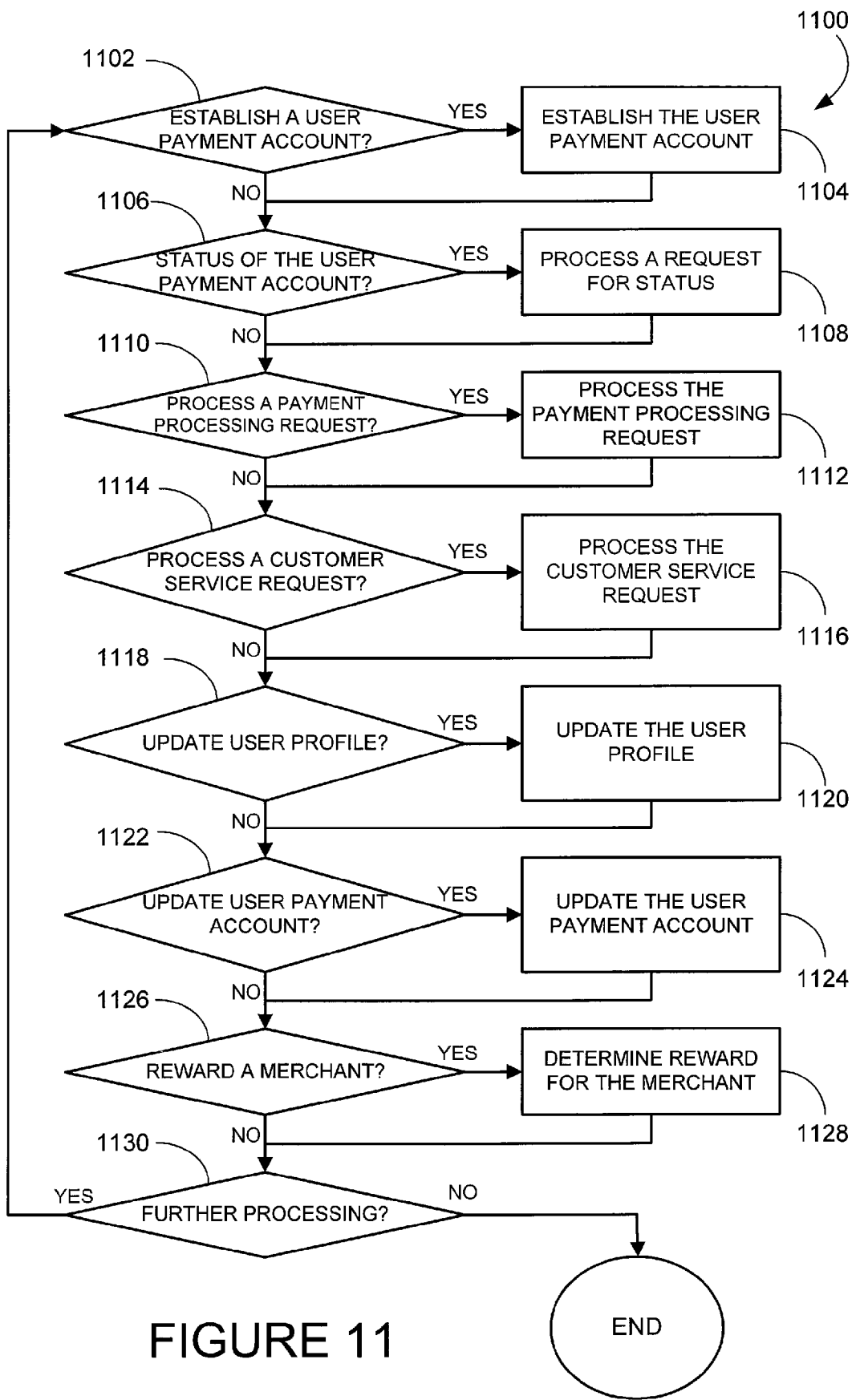
FIG. 11 is a flowchart illustrating a method for utilizing a payment application according to an example embodiment.

Referring to FIG. 11, a method 1100 for utilizing a payment application 122 (see FIG. 1) according to an example embodiment is illustrated.

A determination may be made at decision block 1102 whether to establish a user payment account 420 (see FIG. 4). If a determination is made to establish a user payment account 420, the user payment account 420 may be established at block 1104. An example embodiment of establishing the user payment account 420 is described in greater detail below. If a determination is made at decision block 1102 not to establish a user payment account 420 or upon completion of the operations at block 1104, the method 1100 may proceed to decision block 1106.

At decision block 1106, a determination may be made whether to obtain the status of the user payment account 420. If a determination is made to obtain the status of the user payment account 420, a request for status of the user payment account 420 may be processed at block 1108. An example embodiment of processing a request for the status of the user payment account 420 is described in greater detail below. If a determination is made not to obtain the status of the user payment account 420 at decision block 1106 or upon completion of the operations at block 1108, the method 1100 may proceed to decision block 1110.

A determination may be made at decision block 1110 whether to process a payment processing request. If a determination is made to process a payment processing request, the payment processing request may be processed at block 1112. An example embodiment of processing the payment processing request is described in greater detail below. If a determination is made not to process the payment processing request at decision block 1110 or upon completion of the operations at block 1112, the method 1100 may proceed to decision block 1114.

At decision block 1114, a determination may be made whether to process a customer service request. If a determination is made to process the customer service request, the customer service request may be processed at block 1116. An example embodiment of processing the customer service request is described in greater detail below. If a determination is made at decision block 1114 not to process the customer service request or upon completion of the operations at block 1116, the method 1100 may proceed to the decision block 1118.

A determination may be made at decision block 1118 whether to update a user profile 422. If a determination is made to update the user profile 422, the user profile 422 may be updated at block 1120. For example, one or more fields of the user profile data structure 800 of a user profile 422 may be updated from within the user application 418 (e.g., through use of the account identifier), by the customer service application 414, and/or by the payment application 122 (e.g., which may be sent back to the merchant application 416 through use of the account identifier). If a determination is made not to update the user profile 422 at decision block 1118 or upon completion of the operations at block 1120, the method 1100 may proceed to decision block 1122.

At decision block 1122, a determination may be made whether to modify the user payment account 420 of a user. If a determination is made to modify the user payment account 420, the user payment account 420 may be modified at block 1124. For example, the bank account field 704 or the credit card accounts field 706 of the user payment account data structure 600 may be updated. If a determination is made at decision block 1122 not to update the user payment account 420 of a user or upon completion of the operations at block 1124, the method 1100 may proceed to decision block 1126.

A determination may be made at decision block 1126 whether to reward a merchant. If a determination is made to reward a merchant, a reward may be determined for the merchant at block 1128. An example embodiment of rewarding a merchant is described in greater detail below. If a determination is made not to reward the merchant at decision block 1126 or upon completion of the operations at block 1128, the method 1100 may proceed to decision block 1130.

A determination may be made at decision block 1130 whether to perform further processing. If a determination is made to perform further processing, the method 1100 may return to decision block 1102. If a determination is made not to perform further processing at decision block 1230, the method 1100 may terminate.

Figure 12:
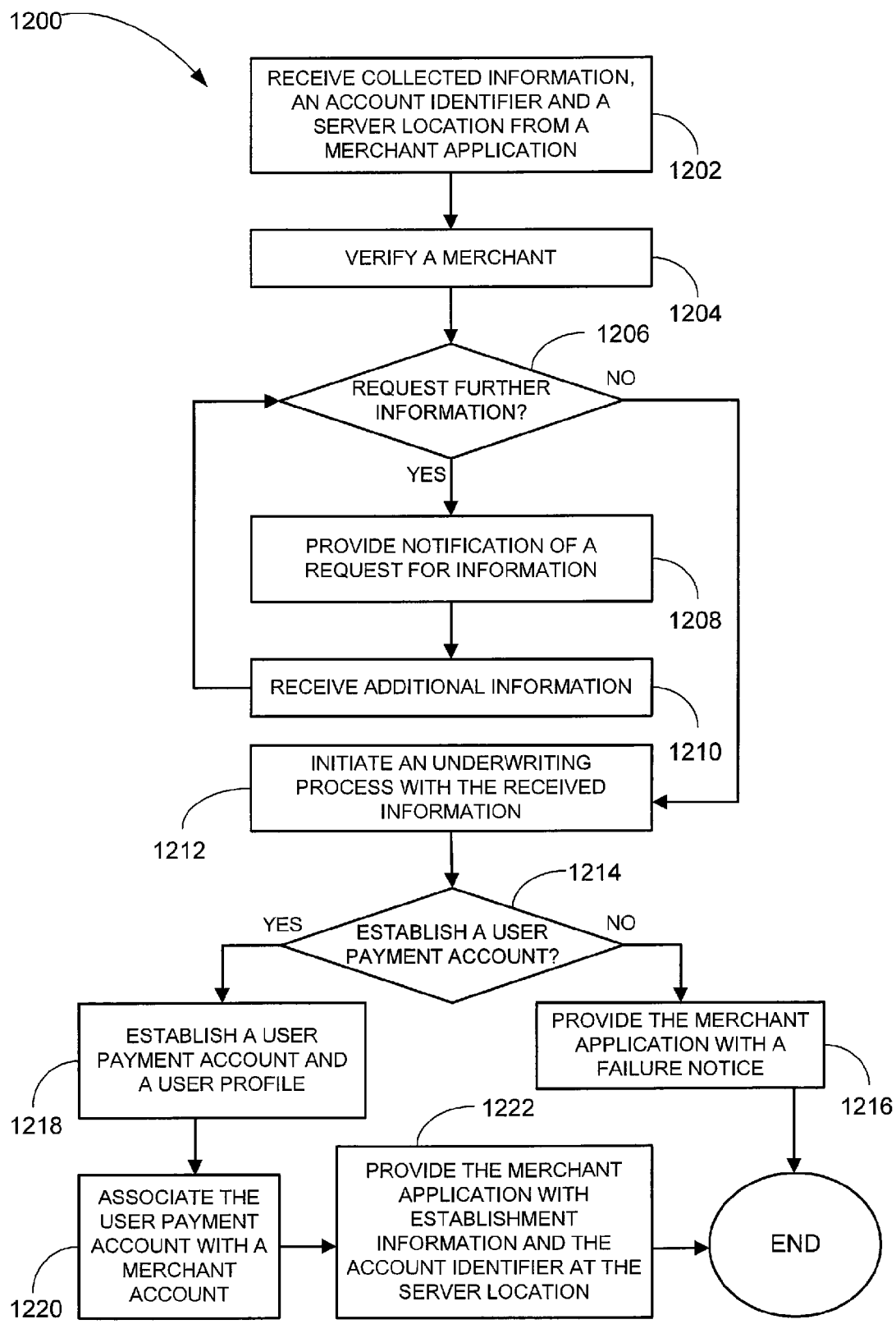
FIG. 12 is a flowchart illustrating a method for establishing a user payment account according to an example embodiment.

Referring to FIG. 12, a method for establishing the user payment account 420 (see FIG. 4) according to an example embodiment is illustrated. In an example embodiment, the method 1200 may be performed at block 1104 (see FIG. 11) and/or by the payment application 122 (see FIG. 1).

Collected information, an account identifier and/or a server location may be received from the merchant application 416 (see FIG. 4) at block 1202. The collected information may include information collected by the merchant application 416 from the user application 418 of a user and/or the merchant user account 426 (see FIG. 4) associated with the user. The server location may be a location of a server operated by a merchant that is designated as a notification location for user transactions. The account identifier may include an identifier to identify a request for a user payment account 420 by a user associated with the collected information.

In an example embodiment, the collected information, the account identifier, and the server location may be received in a pre-designated format. For example, the account identifier may be a token that is provided from the merchant application 416 to the payment application 122.

A merchant associated with the merchant application 416 may optionally be verified at block 1204. For example, the merchant may be verified by using a known IP address and/or receiving an account identifier in an expected format.

A determination may be made at decision block 1206 whether to request further information (e.g., additional information may be needed to complete an underwriting process). For example, the request for the further information may be reviewed to determine whether still further information needed.

If a determination is made to request further information, a notification to request further information may be sent at block 1208. For example, the further information may include a line of business of the user, whether the user is in compliance with an acceptable user policy, a website address, an anticipated amount of accumulated value that may be received, an anticipated payment volume, a selection of a bank account as a payment source, an e-mail address for validation, and the like. In an example embodiment, the notification may be sent to the merchant application 416 to seek further information from the user through the user application 418 and/or may be sent to the user application 418 to seek information directly from the user.

Additional information may be received at block 1210 and the method 1200 may return to decision block 1206. For example, the additional information may be received by the merchant application 416 from a user and provided to the payment application 122. If a determination is made at decision block 1206 not to request additional information, the received information may be used to initiate an underwriting process at block 1212. For example, all received information may be placed in a vetting quite while awaiting for the underwriting process to complete. The underwriting process performed during the operations at block 1212 may determine whether to approve a user payment account for credit card processing. For example, the underwriting process may be short (e.g., a few minutes) or may be long (e.g., several days).

A determination may be made at decision block 1214 whether to establish a user payment account 420. If a determination is made not to establish a user payment account 420, the merchant application 416 may be provided with a failure notice at block 1216. If a determination is made at decision block 1214 to establish a user payment account 420, the user payment account 420 and at least one user profile 422 associated with the user payment account 420 may be established at block 1218 (e.g., as a result of the underwriting process performed at block 1212).

The user payment account 420 may optionally be associated as a sub-account 504 to the merchant account 502 at block 1220. By associating the user payment account 420 as a sub-account 504 to the merchant account 502, the merchant application 416 may be provided with access (e.g., by users with a user profile 422 with sufficient permission) to portions of the user payment account 420 and/or the user profile 422. For example, customer service representatives of the merchant may be able to provide customer service to the user associated with the user payment account 420 by having permission to access portions of the user payment account 420 and/or the user profile 422.

The merchant application 416 may be provided with establishment information and the account identifier at the server location at block 1222. The establishment information may include functionality available to the user such as ability to use virtual terminal, to perform credit card processing, and the like. In an example embodiment, by providing the merchant application 416 with the account identifier, the merchant application 416 may be able to identify for which user (e.g., among the users of the merchant user accounts 426) the user payment account 420 and the user profile 422 have been established.

Upon completion of the operations at block 1216 or block 1222, the method 1200 may terminate.

Figure 13:
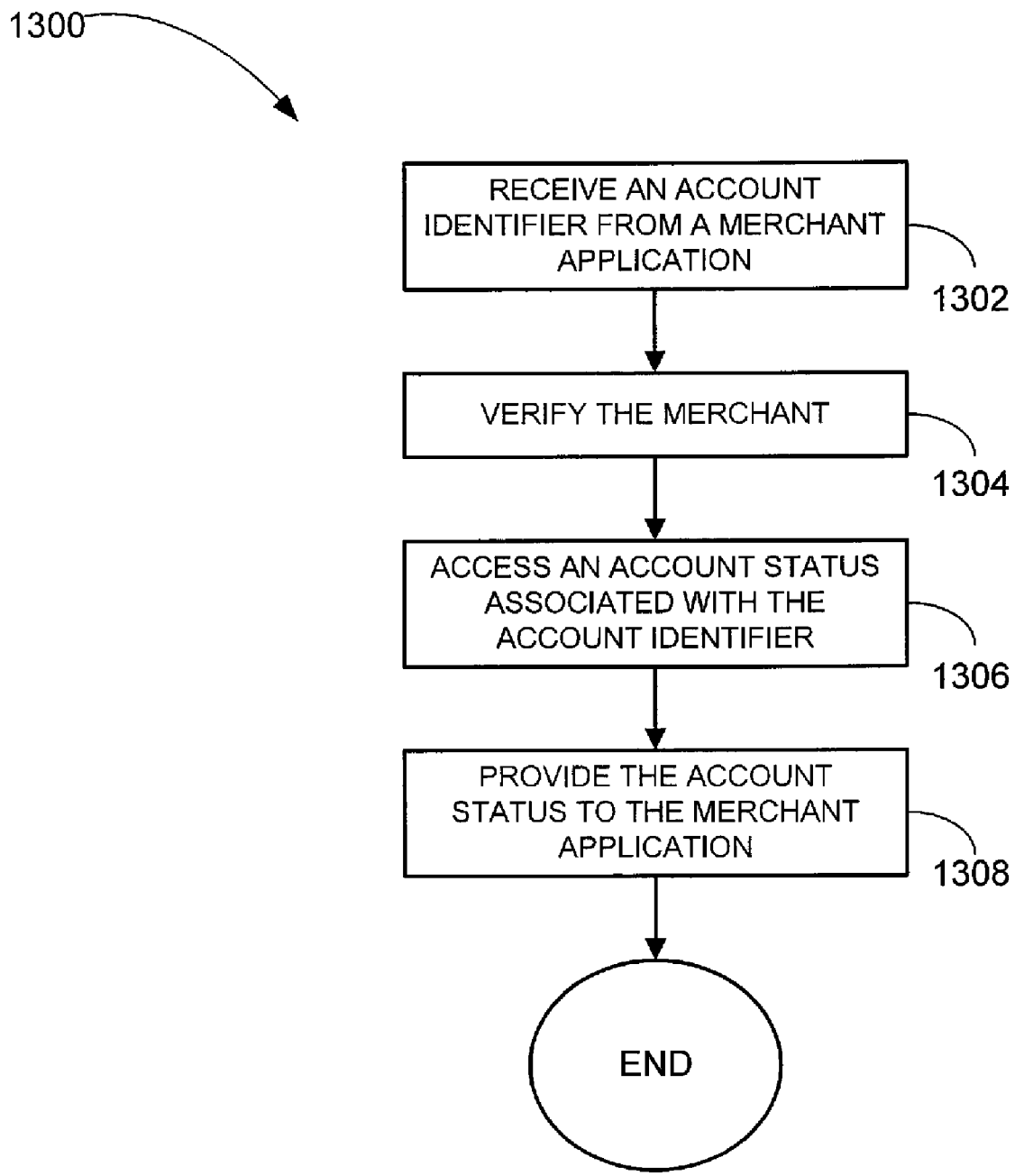
FIG. 13 is a flowchart illustrating a method for processing a request for status according to an example embodiment.

Referring to FIG. 13, a method for processing a request for status according to an example embodiment is illustrated. In an example embodiment, the method 1300 may be performed at block 1108 (see FIG. 11) and/or by the payment application 122 (see FIG. 1).

An account identifier may be received from the merchant application 416 at block 1302. For example, the account identifier may be the same account identifier provided by the merchant application 416 during the operations at block 1202 (see FIG. 12).

A merchant may be verified at block 1304. For example, the operations performed at block 1204 (see FIG. 12) may be performed at block 1304.

An account status associated with an account identifier may be accessed at block 1306. For example, the payment application 122 may contain a status on a determination performed during the underwriting process at block 1212 as to whether a user payment account 420 will be created.

The account status may be provided to the merchant application 416 at block 1308.

Upon completion of the operations at block 1308, the method 1300 may terminate.

In an example embodiment, the method 1300 may be performed during the operation of block 1212 (see FIG. 12) to determine the account status.

Figure 14:
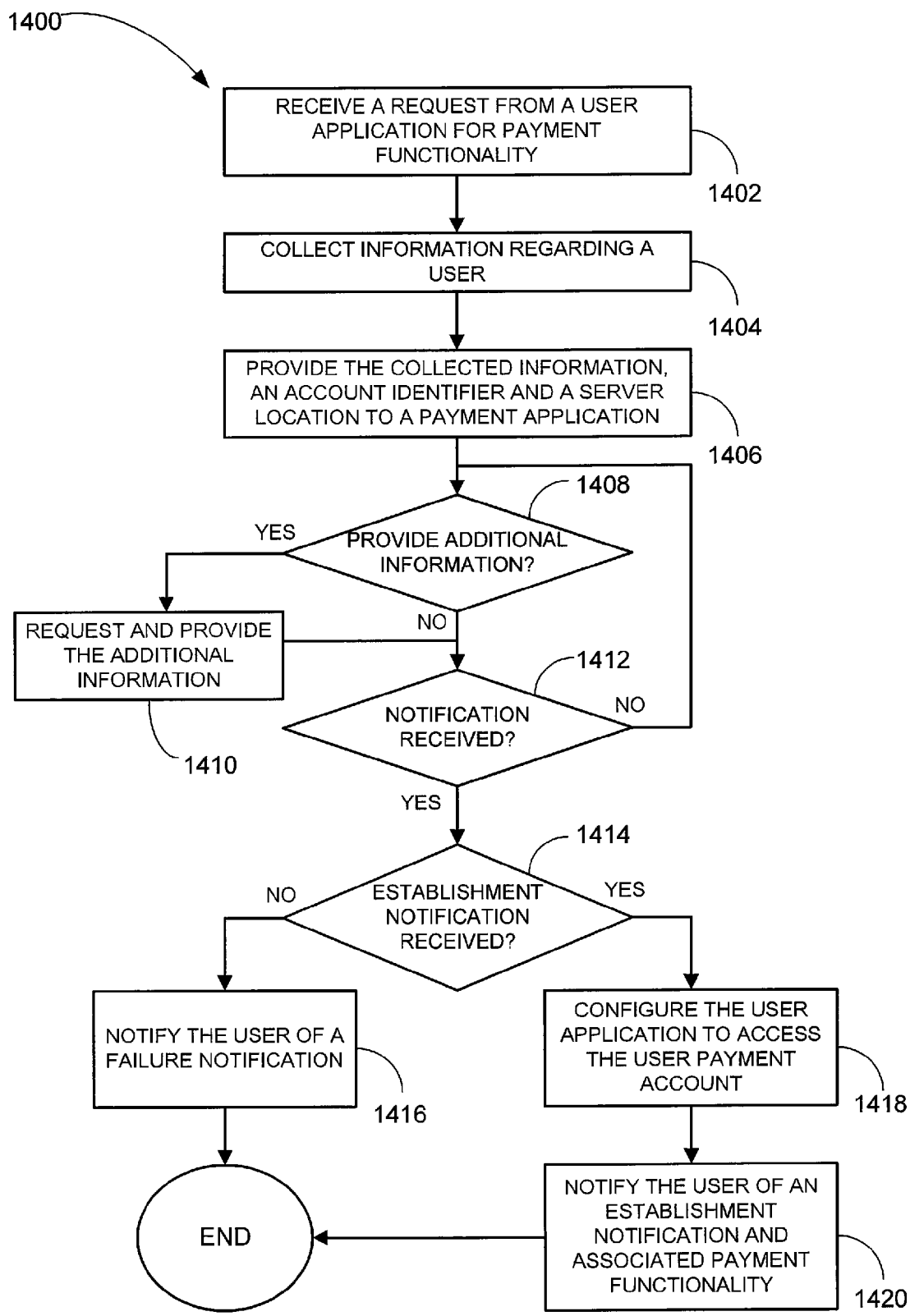
FIG. 14 is a flowchart illustrating a method for establishing a user payment account according to an example embodiment.

Referring to FIG. 14, a method 1400 for establishing a user payment account 420 (see FIG. 4) according to an example embodiment is illustrated. In an example embodiment, the method 1400 may be performed at block 1104 and/or by the merchant application 416 (see FIG. 4).

A request may be received from the user application 418 (see FIG. 4) for payment functionality (e.g., the ability to process credit card payments) at block 1402.

Information may be collected regarding a user associated with the user application 418 at block 1404. For example, the information may be collected from a merchant user account 426 (see FIG. 4) of the user and/or through an interface presented to the user.

The collected information, an account identifier, and a server location may be provided to the payment application 122 (see FIG. 1) at block 1406. For example, the collected information, the account identifier, and the server location may be received by the payment application 122 during the operations at block 1202 (see FIG. 12).

At decision block 1408, a determination may be made as to whether to provide additional information to the payment application 122. For example, the determination whether to provide additional information at decision block 1408 may be based on whether notification of a request for further information is received during the operation at block 1208 (see FIG. 12). If a determination is made to provide additional information, the additional information may be requested of the user (e.g., through the user application 418 or an interface) and provided to the payment application at block 1410. If a determination is made not to provide additional information at decision block 1408 or upon completion of the operations at block 1410, the method 1400 may proceed to decision block 1412.

A determination may be at decision block 1412 as to whether a notification (e.g., a failure notification or an establishment notification) has been received. If a notification has not been received, the method 1400 may return to decision block 1408. If a notification has been received at decision block 1412, the method 1400 may proceed to decision block 1414.

A determination may be made at decision block 1414 as to whether an establishment notification has been received. If an establishment notification has not been received, the user (e.g., through an interface or the user application 418) of a failure notification (e.g., that a user payment account 420 has not been created). If an establishment notification has been received at decision block 1414, the user application 418 may be configured to access the user payment account 420 at block 1418. For example, the user payment account 420 may be linked to the merchant user account 426 of the user to provide the user with payment functionality with the user application 418. The user may be notified of the establishment application and associated payment functionality available through the user application 418 at block 1420.

Upon completion of the operations at block 1416 or block 1420, the method 1400 may terminate.

In an example embodiment, configuring the user application to access the user payment account during the operations at block 1418 may enable transactions to be processed through the user application 418 (e.g., in addition to or instead of processing payments through the payment application 122).

In an example embodiment, configuring the user application 418 to access the user payment account 420 during the operations at block 1418 may include configuring the user application 418 to include functionality from the payment application 122. For example, the user application 418 may be configured to include a limit on a transaction amount, a list of permitted countries from which transactions may be received, and the like.

Figure 15:
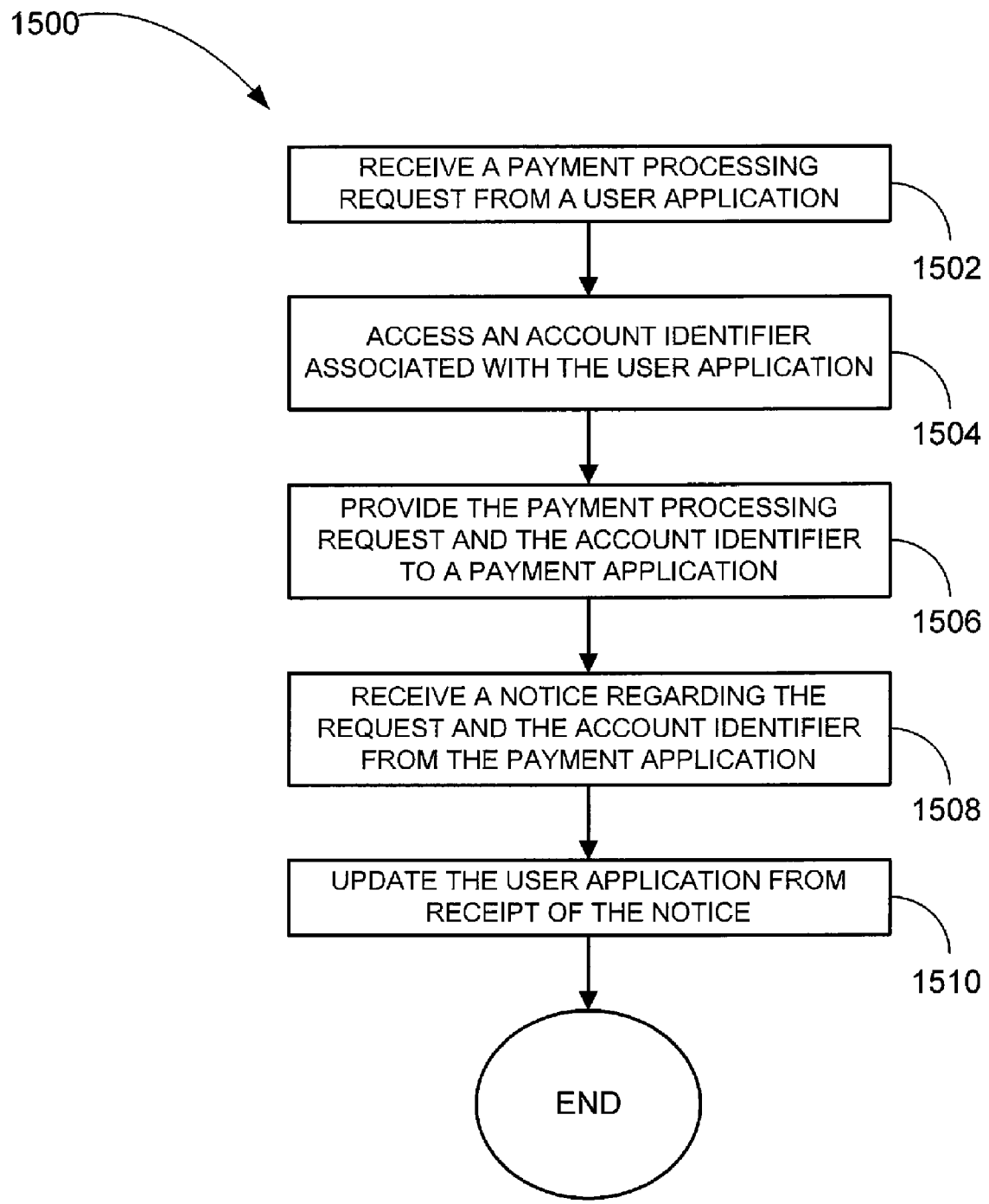
FIG. 15 is a flowchart illustrating a method for processing a payment processing request according to an example embodiment.

Referring to FIG. 15, a method 1500 for processing a payment processing request according to an example embodiment is illustrated. In an example embodiment, the method 1500 may be performed at block 1112 (see FIG. 11) and/or by the merchant application 416 (see FIG. 4).

A payment processing request may be received from the user application 418 at block 1502. The payment processing request may be a request to process a payment received from a buyer.

An account identifier for the user payment account 420 associated with the user application 418 may be accessed at block 1504. For example, the account identifier may be stored in the merchant user account 426 of the user.

The payment processing request and the account identifier may be provided to the payment application 122 (see FIG. 1) at block 1506.

A notice regarding the request (e.g., whether the payment process request was completed successfully or failed) may be received from the payment application 122 at block 1508. For example, the notice may be received at the server location provided during the operations at block 1202 (see FIG. 12).

The user application 418 may be updated from receipt of the notice at block 1510. For example, the user application 418 (and optionally the merchant user account 426) may be updated by the merchant application 416 to reflect that the payment transaction request was completed successfully or failed in accordance with the notice.

Upon completion of the operations at block 1510, the method 1500 may terminate.

Figure 16:
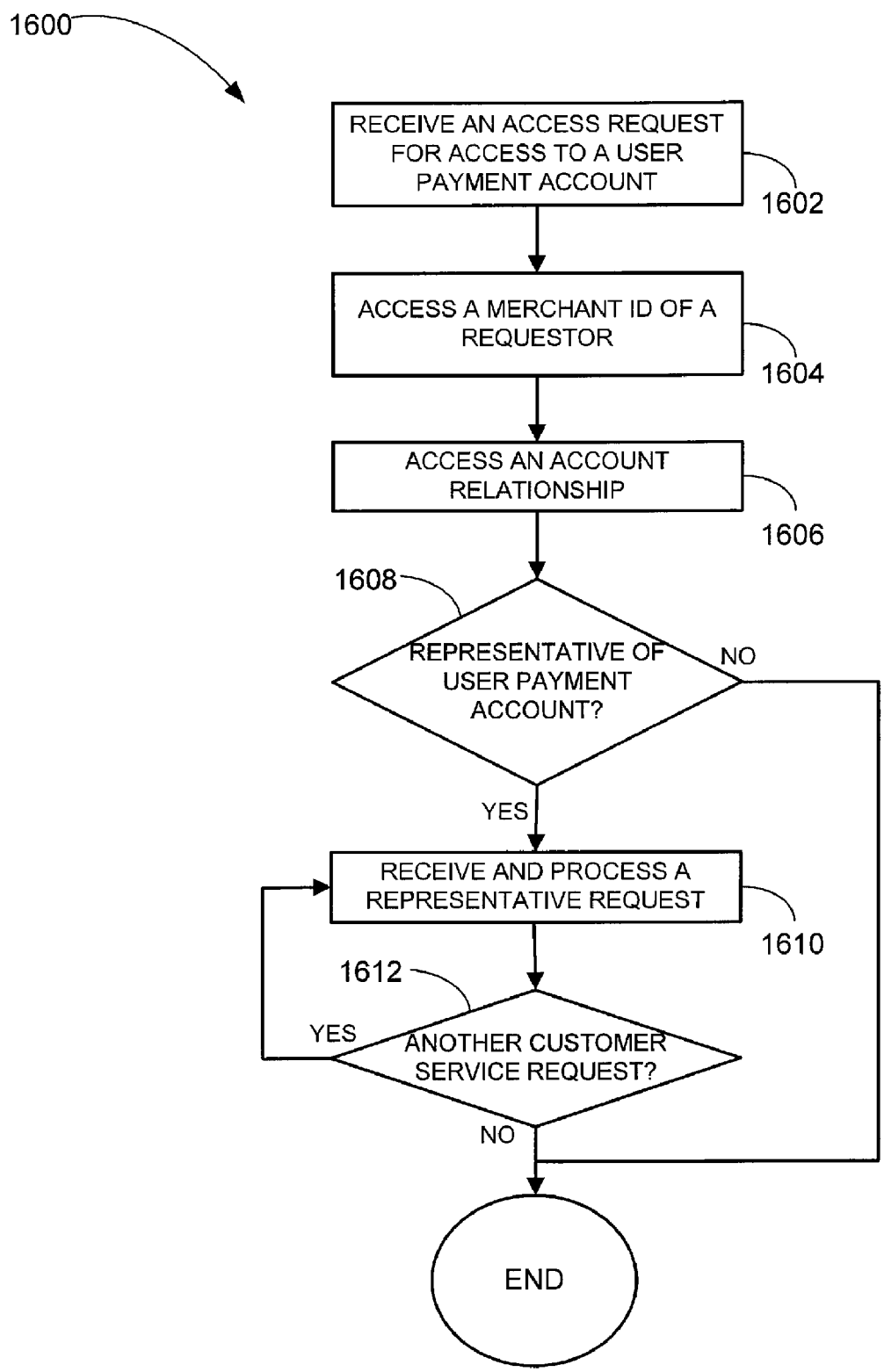
FIG. 16 is a flowchart illustrating a method for processing a customer service request according to an example embodiment.

Referring to FIG. 16, a method 1600 for processing a customer service request according to an example embodiment as illustrated. In an example embodiment, the method 1600 may be performed at block 1116 (see FIG. 11) and/or by the payment application 122.

An access request for access to a user payment account 420 (see FIG. 4) may be received from a requestor at block 1602.

A merchant id of the requestor may be accessed at block 1604. For example, the merchant id may be retained in the merchant id field 1006 (see FIG. 10) of the requestor.

An account relationship 424 between a merchant identified by the merchant id and the user payment account 420 may be accessed at block 1606. For example, the accessed account relationship 424 may indicate whether the user payment account 420 is a sub-account 504 of the merchant account 502 of the merchant.

A determination may be made at decision block 1608 as to whether the requestor is a representative of the user payment account 420. For example, the requestor may be a representative when the account relationship 424 indicates that the user payment account 420 is a sub-account 504 of the merchant account 502.

If the requestor is a representative of the user payment account 420, a representative request from the requestor may be received and processed at block 1610. For example, the representative request may be received through an API from the customer service application 414. An example embodiment of receiving and processing the representative request is described in greater detail below.

A determination may be made at decision block 1612 whether to process another representative request. If a determination is made to process another customer service request, the method 1600 may return to block 1610. If a determination is made not to process another representative request at decision block 1612 or if the requester is not an authorized representative at decision block 1608, the method 1600 may terminate.

Figure 17:
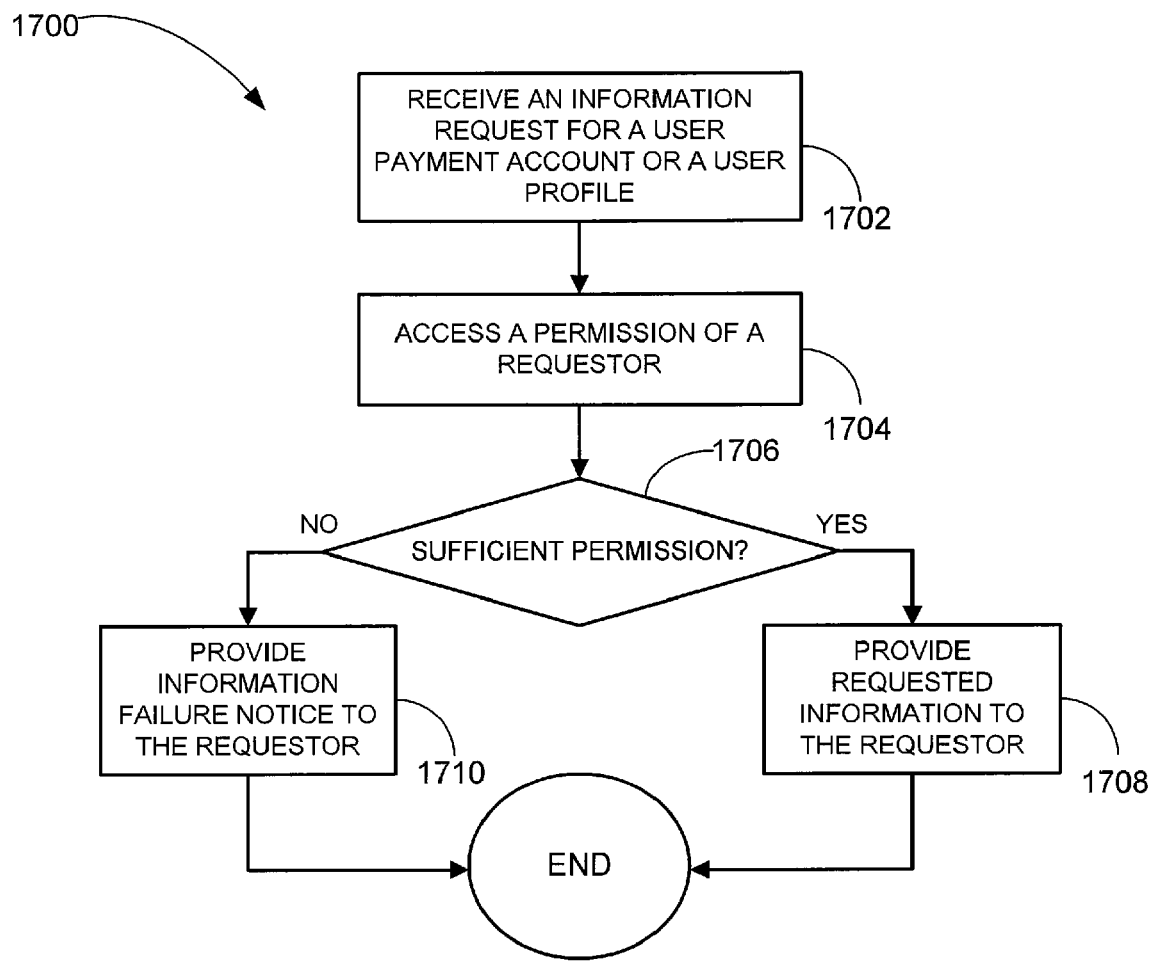
FIGS. 17-19 are flowcharts illustrating a method for receiving and processing a representative request according to an example embodiment.

Referring to FIG. 17, a method 1700 for receiving and processing a representative request according to an example embodiment is illustrated. In an example embodiment, the method 1700 may be performed at block 1610 (see FIG. 16) and/or by the payment application 122 (see FIG. 1).

An information request may be received from a requestor at block 1702. The information request may be a request for information retained in one of the fields of the user payment account 420 and/or the user profile 422 (see FIG. 4), a history of actions in the audit table 318, and the like for a particular user. By way of example, the information request may be used to investigate a disputed transaction.

A permission may be accessed for the requester at block 1704. For example, a permission contained within the permissions field 1004 (see FIG. 10) may be accessed to determine whether the requester is authorized to receive the information requested by the information request.

A determination may be made at decision block 1706 as to whether the requestor is authorized (e.g., by the permissions) to access the information of the information request. If the requester is authorized, the requested information may be provided to the requester at block 1708. If a determination is made that the requestor is not authorized at decision block 1706, an information failure notice may be provided to the requester at block 1710. Upon completion of the operations at block 1708 or block 1710, the method 1700 may terminate.

Figure 18:
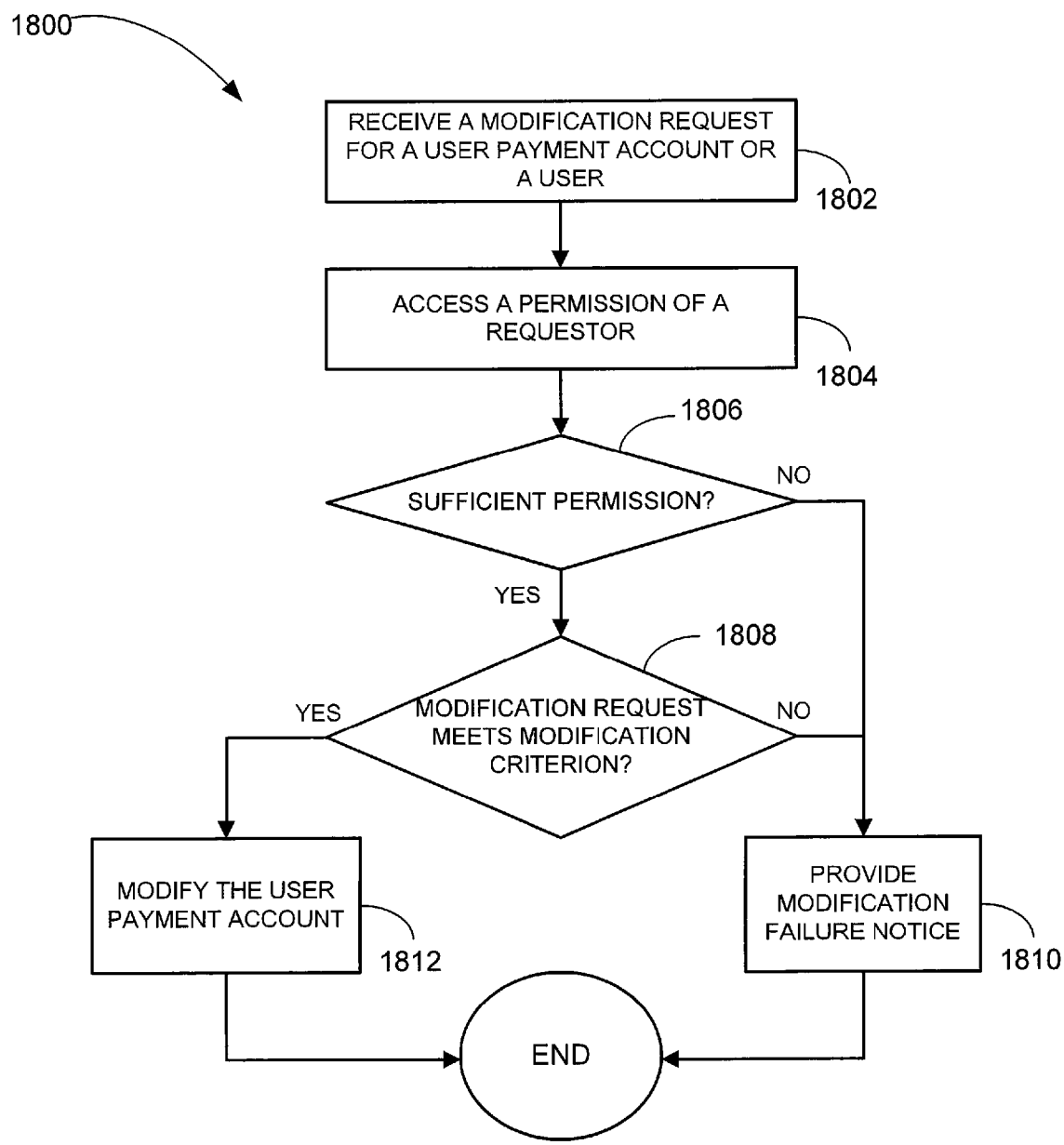

Referring to FIG. 18, a method 1800 for receiving and processing a representative request according to an example embodiment is illustrated. In an example embodiment, the method 1800 may be performed at block 1610 (see FIG. 16) and/or by the payment application 122 (see FIG. 1).

A modification request may be received from a requester at block 1802. The modification request may be a request to modify information retained in one of the fields of the user payment account 420 and/or the user profile 422 (see FIG. 4) for a particular user. By way of example, the modification request may be used to reset a password contained in the password field 806 (see FIG. 8).

A permission may be accessed for the requestor at block 1804. For example, a permission contained within the permissions field 1004 (see FIG. 10) may be accessed to determine whether the requestor is authorized to modify the information requested by the modification request.

A determination may be made at decision block 1806 as to whether the requestor is authorized (e.g., by the permissions) to modify the information specified in the modification request. If the requester is authorized, a determination may be made at decision block 1808 as to whether the modification request meets a modification criterion. For example, the modification criterion may include that the requester has an appropriate permission, that the merchant (e.g., from the merchant account 502) associated with the requester has authority to make the modification request, that the modification is appropriate, that the modification request is below a certain number of modifications requests received from a requestor and/or by a user during a time period, and the like.

If the modification request does not meet the modification criterion at decision block 1808 or if the requester is not authorized at decision block 1806, a modification failure notice may be provided at block 1810. If the modification request meets the modification criterion at decision block 1808, a modification to the user payment account 420 and/or the user profile 422 may be made at block 1812. Upon completion of the operations at block 1810 or 1812, the method 1800 may terminate.

Figure 19:
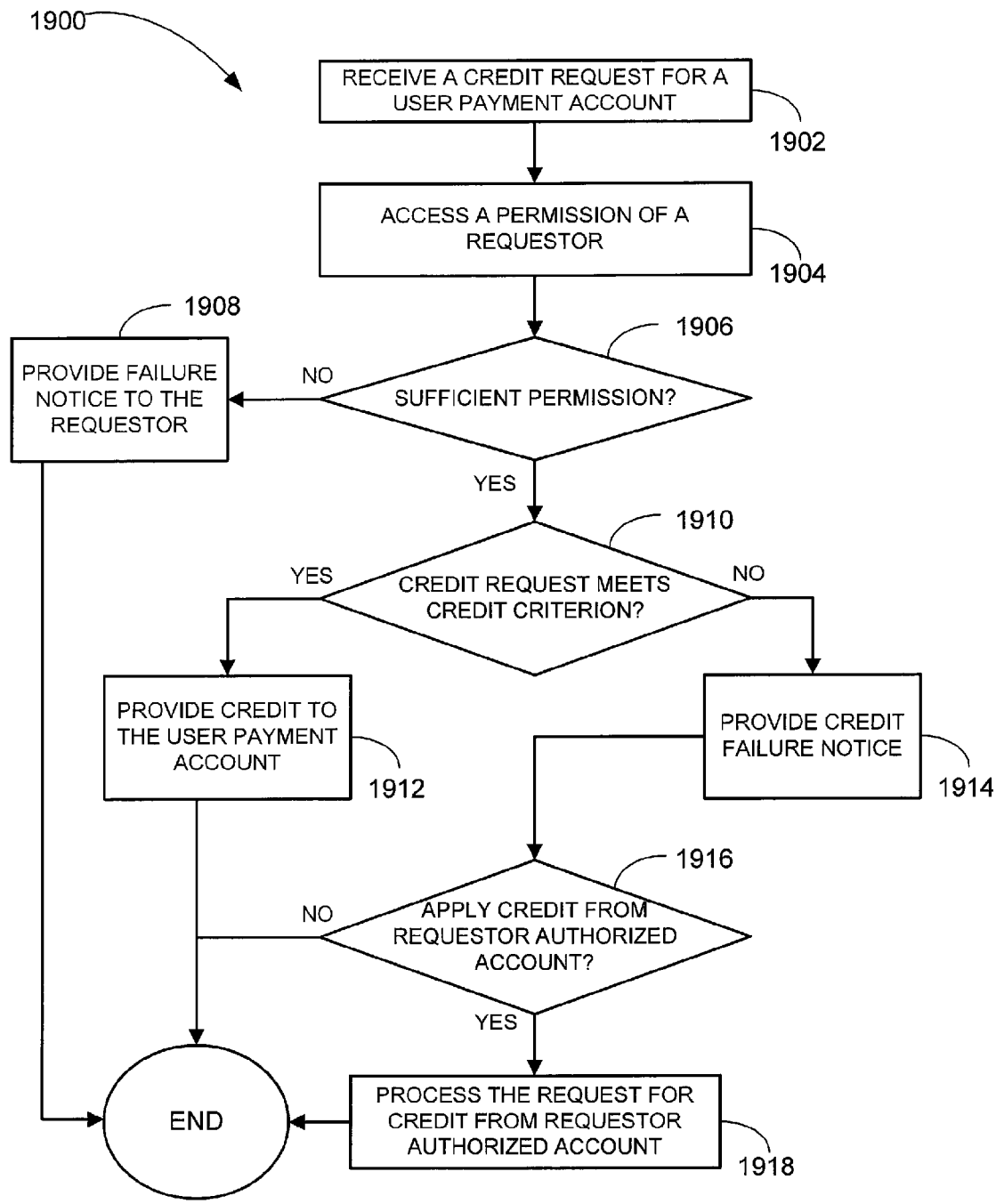

Referring to FIG. 19, a method 1900 for receiving and processing a representative request according to an example embodiment is illustrated. In an example embodiment, the method 1900 may be performed at block 1610 (see FIG. 16) and/or by the payment application 122 (see FIG. 1).

A credit request may be received from a requestor at block 1902. The credit request may be a request to provide credit (e.g., accumulated value) to the user payment account 420 (e.g., a balance in the balance field 702) for a particular user. By way of example, the credit request may be used to provide credit in an amount due to a lost opportunity, compensation for aggravation, and the like.

A permission may be accessed for the requestor at block 1904. For example, a permission contained within the permissions field 1004 (see FIG. 10) may be accessed to determine whether the requestor is authorized to credit the user payment account 420 requested by the credit request.

A determination may be made at decision block 1906 as to whether the requestor is authorized (e.g., by the permissions) to request the credit specified in the credit request. If the requestor is not authorized, a failure notice may be provided to the requestor at block 1908. If a determination is made at decision block 1906 that the requester is authorized, the method 1900 may proceed to decision block 1910.

At decision block 1910, a determination may be made as to whether the credit request meets the credit criterion. For example, the credit criterion may include that the requestor has an appropriate permission, that the merchant (e.g., from the merchant account 502) associated with the requestor has authority to make the credit request, that the credit request is of an appropriate amount (e.g., below a credit threshold), that the credit request is below a certain number of modifications requests received from a requestor and/or by a user during a time period, and the like. If the credit request meets the credit criterion, credit may be provided (e.g., by an operator of the payment application 122) to the user payment account 420 at block 1912. If a determination is made that the credit request does not meet the credit criterion at decision block 1910, the method 1900 may proceed to block 1914.

A credit failure notice may be provided at block 1914. A determination may be made at decision block 1916 as whether to apply credit from a requestor authorized payment account (e.g., from the merchant account 502 or a user payment account 420 associated with the merchant). If a determination is made to apply credit from the requester authorized account, the request for credit may be processed from the requestor authorized account at block 1918.

If a determination is made not to apply credit from the requestor authorized account at decision block 1916, or upon completion of the operations at block 1908 or block 1912, the method 1900 may terminate.

Figure 20:
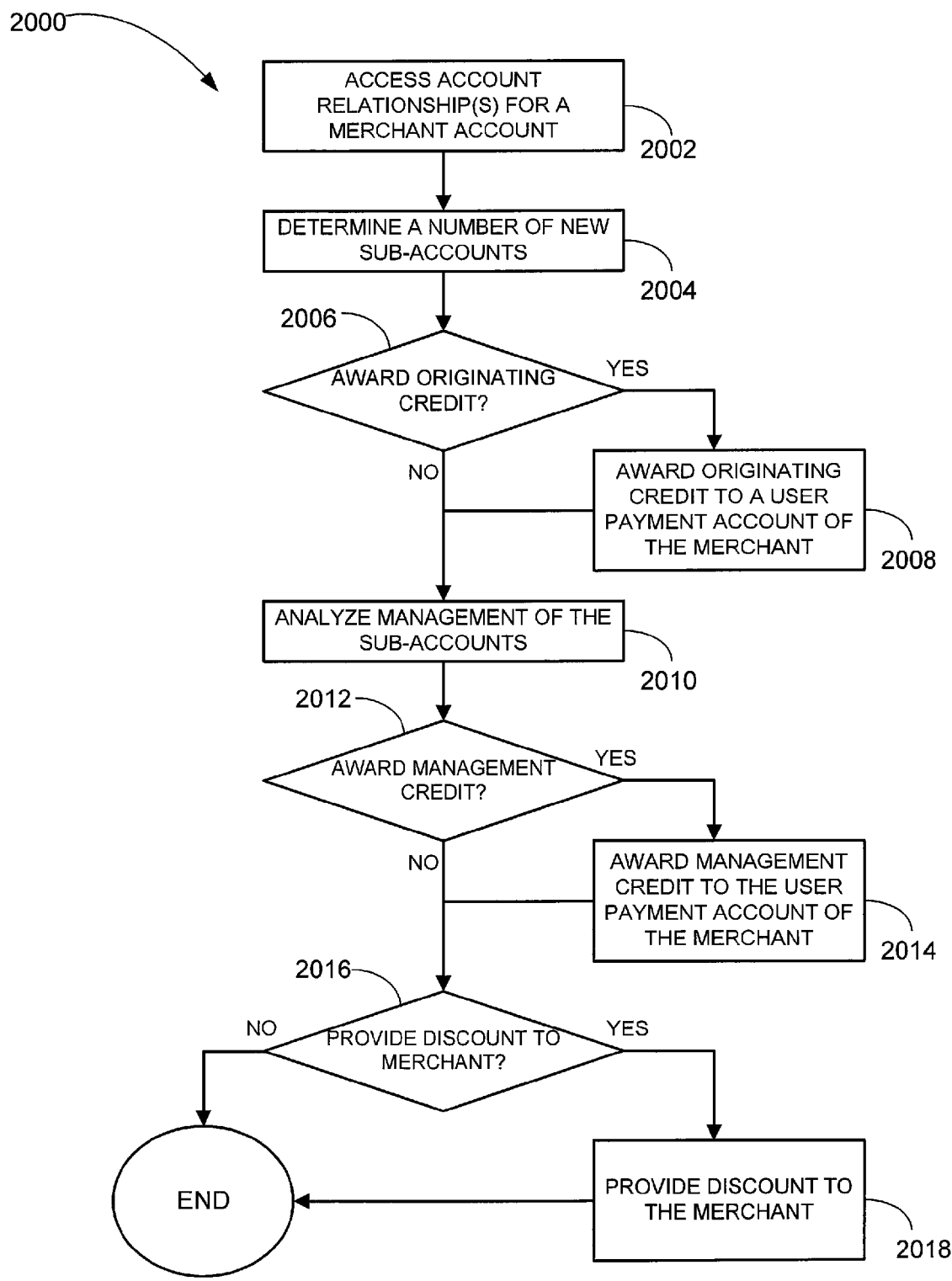
FIG. 20 is a flowchart illustrating a method for determining a reward for a merchant according to an example embodiment.

Referring to FIG. 20 a method 2000 for determining a reward for a merchant according to an example embodiment is illustrated. In example embodiment, the method 2000 may be performed at block 1128 (see FIG. 11) and/or by the payment applications 122 (see FIG. 1).

One or more account relationships 424 for a merchant account 502 may be accessed at block 2002.

A number of new sub-accounts 504 may be determined at block 2004. For example, the number of new sub-accounts 504 may be a number of sub-accounts 504 created since a previous time the method 2000 was performed may be determined for a particular merchant.

A determination may be made at decision block 2006 whether to award originating credit to the merchant. If a determination is made to award originating credit, originating credit (e.g., accumulated value provide to the merchant for obtaining a number of new sub-accounts 504) may be awarded to a user payment account 420 associated with the merchant (e.g., the merchant account 502) at block 2008. If a determination is made not to award originating credit at decision block 2006 or upon completion of the operations at block 2008, the method 2000 may proceed to block 2010.

Management of the sub-accounts 504 associated with the merchant accounts 502 of the merchant may be analyzed at block 2010. For example, a total number of sub-accounts 504 for a merchant may compared against a reward structure for a total account number, a number of customer service requests placed by the merchant during a time period may be compared against a reward structure for a total number of service calls handled, for a total payment volume may be compared against a reward structure for total payment volumes, and the like.

A determination may be made at decision block 2012 whether to award management credit (e.g., accumulated valued provided to the merchant for management of sub-accounts 504). If a determination is made to award management credit, management credit may be awarded to the user payment account 420 associated with the merchant (e.g., the merchant account 502) at block 2014. If a determination is made not to award management credit at decision block 2012 or upon completion of the operations at block 2014, the method 2000 may proceed to decision block 2016.

At decision block 2016, a determination may be made whether to provide a discount to the merchant. For example, the discount may include a discounted rate for payment processing provided to the merchant account 502 and/or the sub-accounts 504 associated with the merchant account 502. Other discounts may also be provided. If a determination is made to provide a discount to the merchant, the discount may be provided to the merchant at block 2018. If a determination is made not to provide a discount to the merchant at decision block 2016 or upon completion of the operations at block 2018, the method 2000 may terminate.

Figure 21:
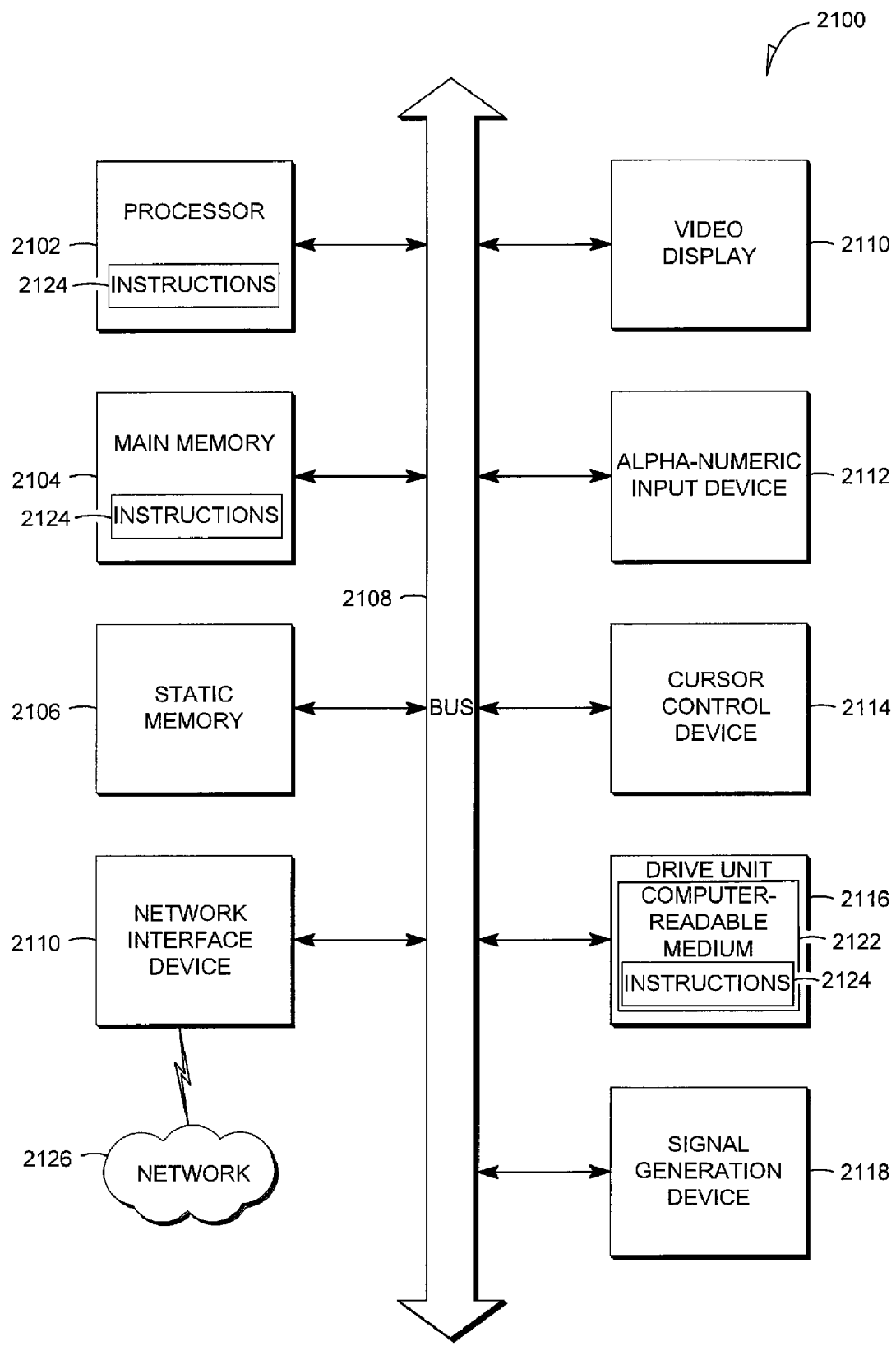
FIG. 21 is a block diagram diagrammatic representation of machine in the example form of a computer system within which a set of instructions, for causing the machine to perform any one or more of the methodologies discussed herein, may be executed.

FIG. 21 shows a diagrammatic representation of machine in the example form of a computer system 2100 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU) a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a drive unit 2116, a signal generation device 2118 (e.g., a speaker) and a network interface device 2110.

The drive unit 2116 includes a machine-readable medium 2122 on which is stored one or more sets of instructions (e.g., software 2124) embodying any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting machine-readable media.

The software 2124 may further be transmitted or received over a network 2126 via the network interface device 2110.

While the machine-readable medium 2122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for user payment account management have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
  receiving user information regarding a user, an account identifier, and a server location from a merchant application, the account identifier identifying the user to the merchant application, at least a portion of the user information being obtained by the merchant application from an existing merchant user account, the existing merchant user account allowing the user associated with the existing merchant user account to communicate with the merchant application in order to participate in selling or buying of an item, the merchant application to provide marketplace functionalities independent from payment services;
  initiating an underwriting process using the user information to determine whether to establish a user payment account for the user, the user payment account to enable the user to perform at least one of making a payment and receiving a payment in a networked system;
  establishing the user payment account for the user in response to a result of the underwriting process; and
  providing establishment information of the established user payment account and the account identifier at the server location designated by the merchant application, the establishment information including information regarding functionality available through use of the user payment account.

2. The method of claim 1, wherein the receiving of the user information comprises:
  receiving collected information regarding the user, the account identifier, and the server location from a sender;
  requesting further information regarding the user; and
  receiving additional information regarding the user, wherein the initiating of the underwriting process uses the collected information and the additional information to determine whether to establish the user payment account for the user.

3. The method of claim 1, further comprising:
  verifying the merchant application.

4. The method of claim 1, further comprising:
  linking the user payment account with the merchant user account of the merchant application, the linking providing the merchant application with access to at least a portion of the user payment account.

5. The method of claim 1, wherein the user payment account comprises at least one of:
  an account type field to provide an account identifier to identify whether the user payment account is associated with a person or a business,
  an account id field to provide an account id to enable identification of the user payment account,
  an electronic payment field to provide access to an account value from a payment source, and
  an authorized user field to designate the user as being authorized to access the user payment account.

6. The method of claim 5, wherein the electronic payment field is at least one of:

a balance field for access to the account value of the user payment account, a bank account field for access to the account value in a bank account, and a credit card account field for access to the account value from a credit card account.

7. A method comprising:

receiving a request from a user application in a networked system for payment functionality, the payment functionality including processing of a credit card payment;

accessing user information regarding a user, the user associated with the user application, at least a portion of the user information being obtained from an existing merchant user account, the existing merchant user account allowing the user associated with the existing merchant user account to communicate with a merchant application in order to participate in selling or buying of an item, the merchant application to provide marketplace functionalities independent from payment services;

providing the user information, an account identifier, and a server location to a payment application, the payment application capable of providing the payment functionality to the user application;

receiving establishment information of a user payment account from the payment application, the establishment information including information regarding the payment functionality available through use of the user payment account; and configuring the user application to access the user payment account for the payment functionality.

8. The method of claim 7, comprising:

notifying the user of receipt of the establishment notification and configuration of the user application.

9. A method comprising:

receiving a payment processing request from a user application in a networked system;

accessing an account identifier associated with the user application and a user payment account, the account identifier being accessed from an existing merchant user account, the existing merchant user account allowing a user associated with the existing merchant user account to communicate with a merchant application in order to participate in selling or buying of an item, the merchant application to provide marketplace functionalities independent from payment services;

providing the payment processing request and the account identifier to a payment application, the payment application capable of processing the payment processing request;

receiving a notice regarding processing of the payment processing request and the account identifier from the payment application; and updating the user application from receipt of the notice.

10. The method of claim 9, wherein the updating comprises:

updating the user application to reflect that processing of the payment processing request was completed successfully.

11. A method comprising:

using one or more processors to perform at least some portion of the following receiving a processing request in a networked system from a requestor, the processing request being a request to process one or more representative requests from the requestor for at least one of a user payment account or a user profile associated with the user payment account;

identifying a merchant associated with the requestor from a merchant identifier stored in a user profile of the requestor;

accessing account relationship information of the identified merchant, the account relationship information being stored in a database, the account relationship information identifying whether the user payment account is a sub-account of a merchant account of the identified merchant; and processing the one or more representative requests from the requestor when the user payment account is identified as a sub-account of the merchant account for which the requestor has permission to access, the merchant account allowing a user associated with the merchant account to communicate with a merchant application in order to participate in selling or buying of an item, the merchant application to provide marketplace functionalities independent from payment services.

12. The method of claim 11, wherein the receiving and processing comprises:

receiving an information request for at least one of the user payment account or the user profile, the information request being a request for information retained in a field of at least one of the user payment account or the user profile;

accessing a permission of the requestor, the permission indicating a right of the requestor to access the requested information; and providing the requested information to the requestor when the permission indicates the right of the requestor to access the requested information.

13. The method of claim 11, wherein the receiving and processing comprises:

receiving a modification request for at least one of the user payment account or the user profile, the modification request being a request to modify information retained in a field of at least one of the user payment account or the user profile;

accessing a permission of the requestor, the permission indicating a right of the requestor to modify the requested information; and modifying the requested information when the permission indicates the right of the requestor to modify the requested information and a modification criterion is met.

14. The method of claim 13, wherein the modification criteria comprises that the modification request is below a certain number of total modification requests received from the requestor during a time period.

15. The method of claim 11, wherein the receiving and processing comprises:

receiving a credit request for the user payment account, the credit request being a request to provide credit to the user payment account;

accessing a permission of the requestor, the permission indicating a right of the requestor to provide credit; and providing credit from a merchant account when the permission indicates the right of the requestor to provide the credit and the credit criterion is not met.

16. The method of claim 15, wherein the credit criterion comprises that the credit request is below a credit threshold.

17. The method of claim 11, wherein the user profile includes at least one of:

an e-mail address field to provide an e-mail address of a user associated with the user account, a personal/business information field to provide at least one of a name, a street address, a city, a state, a zip code, a phone number, a social security number, or an employee identification number, a security question response field to provide a security question response, a pin number field to provide a pin number for the user account, an account id field to provides an account id to associate the user profile with the user payment account, a permissions field to enable the user to have at least one of certain access, modification, or use rights.

18. An apparatus comprising:

means for receiving a request from a user application in a networked system for payment functionality, the payment functionality including processing of a credit card payment;

means for accessing user information regarding a user, the user associated with the user application, at least a portion of the user information being obtained from an existing merchant user account, the existing merchant user account allowing the user associated with the existing merchant user account to communicate with a merchant application in order to participate in selling or buying of an item, the merchant application to provide marketplace functionalities independent from payment services;

means for providing the user information, an account identifier, and a server location to a payment application, the payment application capable of providing the payment functionality to the user application;

means for receiving establishment information of a user payment account from the payment application, the establishment information including information regarding the payment functionality available through use of the user payment account; and means for configuring the user application to access the user payment account for the payment functionality.

19. The apparatus of claim 18, further comprising:

means for notifying the user of receipt of the establishment information and configuration of the user application.

20. A machine-readable medium comprising instructions, which when executed by a machine, cause the machine to perform a method, the method comprising:

receiving user information regarding a user in a networked system, an account identifier, and a server location from a merchant application, the account identifier identifying the user to the merchant application, at least a portion of the user information being obtained by the merchant application from an existing merchant user account, the existing merchant user account allowing the user associated with the existing merchant user account to communicate with the merchant application in order to participate in selling or buying of an item, the merchant application to provide marketplace functionalities independent from payment services;

initiating an underwriting process using the user information to determine whether to establish a user payment account for the user, the user payment account enabling the user to perform at least one of making a payment or receiving a payment in a networked system;

establishing the user payment account for the user in response to a result of the underwriting process; and providing establishment information of the established user payment account and the account identifier at the server location designated by the merchant application, the establishment information including information regarding functionality available through use of the user payment account.

21. The machine-readable medium of claim 20, wherein the method further comprises associating the user payment account with a merchant account of the merchant application.

22. A non-transitory machine-readable medium comprising instructions, which when executed by a machine, cause the machine to perform a method, the method comprising:

receiving a processing request in a networked system from a requestor, the processing request being a request to process one or more representative requests from the requestor for at least one of a user payment account of a user or a user profile associated with the user payment account of the user;

identifying a merchant associated with the requestor from a merchant identifier stored in a user profile of the requestor;

accessing account relationship information of the merchant based on identification of the merchant, the account relationship information defining a sub-account associated with a merchant account of the merchant; and processing the one or more representative requests of the requestor when the user payment account is a sub-account associated with the merchant account for which the requestor has permission to access, the merchant account allowing the merchant associated with the merchant account to communicate with a merchant application in order to participate in selling or buying of an item, the merchant application to provide marketplace functionalities, the marketplace functionalities independent from payment services.

23. The machine-readable medium of claim 22, wherein the method further comprises:

receiving an information request for at least one of the user payment account or the user profile, the information request being a request for information retained in a field of at least one of the user payment account or the user profile;

accessing a permission of the requestor, the permission indicating a right of the requestor to access the requested information; and providing the requested information to the requestor when the permission indicates the right of the requestor to access the requested information.

24. The machine-readable medium of claim 22, wherein the method further comprises:

receiving a credit request for the user payment account, the credit request being a request to a request to provide credit to the user payment account;

accessing a permission of the requestor, the permission indicating a right of the requestor to provide credit; and providing credit from a merchant account when the permission indicates the right of the requestor to provide the credit and the credit criterion is not met.

25. The method of claim 1, further comprising:

linking the user payment account with the merchant user account of the merchant application, the linking enabling the user to perform the at least one of making a payment and receiving a payment in a networked system using a user application of a client device of the user.

* * * * *